(12) United States Patent
Price et al.

(10) Patent No.: US 11,488,318 B2
(45) Date of Patent: Nov. 1, 2022

(54) SYSTEMS AND METHODS FOR TEMPORALLY CONSISTENT DEPTH MAP GENERATION

(71) Applicant: MICROSOFT TECHNOLOGY LICENSING, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 15/931,541

(22) Filed: May 13, 2020

(65) Prior Publication Data
US 2021/0358155 A1 Nov. 18, 2021

(51) Int. Cl.
*G06T 7/593* (2017.01)
*G06T 7/70* (2017.01)
*H04N 13/128* (2018.01)
*H04N 13/271* (2018.01)

(52) U.S. Cl.
CPC .............. *G06T 7/593* (2017.01); *G06T 7/70* (2017.01); *H04N 13/128* (2018.05); *H04N 13/271* (2018.05)

(58) Field of Classification Search
CPC ........... G06T 7/593; G06T 7/70; G06T 3/403; G06T 2207/10021; G06T 2207/20028; H04N 13/128; H04N 13/271
See application file for complete search history.

(56) References Cited

U.S. PATENT DOCUMENTS

| | | | |
|---|---|---|---|
| 8,737,723 B1* | 5/2014 | Kwatra | G06T 7/593 382/154 |
| 9,704,250 B1* | 7/2017 | Shah | H04N 5/2351 |
| 11,062,471 B1* | 7/2021 | Zhong | G06T 7/593 |
| 2008/0267494 A1* | 10/2008 | Cohen | G06T 3/4007 382/166 |
| 2012/0249750 A1* | 10/2012 | Izzat | H04N 13/25 348/54 |
| 2013/0083021 A1* | 4/2013 | Cohen | G06T 17/00 345/420 |

(Continued)

OTHER PUBLICATIONS

Shin et al., Hierarchical Bilateral filtering based disparity estimation for view synthesis. (Year: 2016).*

(Continued)

*Primary Examiner* — John B Strege
(74) *Attorney, Agent, or Firm* — Workman Nydegger

(57) ABSTRACT

Systems and methods are provided for performing temporally consistent depth map generation by implementing acts of obtaining a first stereo pair of images of a scene associated with a first timepoint and a first pose, generating a first depth map of the scene based on the first stereo pair of images, obtaining a second stereo pair of images of the scene associated with at a second timepoint and a second pose, generating a reprojected first depth map by reprojecting the first depth map to align the first depth map with the second stereo pair of images, and generating a second depth map that corresponds to the second stereo pair of images using the reprojected first depth map.

20 Claims, 20 Drawing Sheets

(56) References Cited

U.S. PATENT DOCUMENTS

| | | | |
|---|---|---|---|
| 2014/0063188 A1* | 3/2014 | Smirnov | G06T 7/593 |
| | | | 348/43 |
| 2016/0012567 A1* | 1/2016 | Siddiqui | H04N 13/271 |
| | | | 382/154 |
| 2019/0012804 A1* | 1/2019 | Wang | G06T 3/4038 |
| 2019/0101758 A1* | 4/2019 | Zhu | G06T 3/00 |
| 2020/0099920 A1* | 3/2020 | Khamis | G06T 7/90 |
| 2022/0028169 A1* | 1/2022 | Price | G06T 19/006 |

OTHER PUBLICATIONS

Baek, et al., "Temporal stereo disparity estimation with graph cuts", In Proceedings of Asia-Pacific Signal and Information Processing Association Annual Summit and Conference, Dec. 16, 2015, pp. 184-187.

Dobias, et al., "Real-time global prediction for temporally stable stereo", In Proceedings of IEEE International Conference on Computer Vision Workshops, Novembers, 2011, pp. 704-707.

Leung, et al., "An energy minimisation approach to stereo-temporal dense reconstruction", In Proceedings of the 17th International Conference on Pattern Recognition, Aug. 26, 2004, 4 Pages.

Na, et al., "Prediction of disparity and its application to stereo matching", In Proceedings of International Workshop on Robot and Human Communication, Aug. 26, 2013, pp. 541-546.

"International Search Report and Written Opinion Issued in PCT Application No. PCT/US2021/019308", dated Jul. 30, 2021, 40 Pages. (MS# 408400-WO-PCT).

* cited by examiner

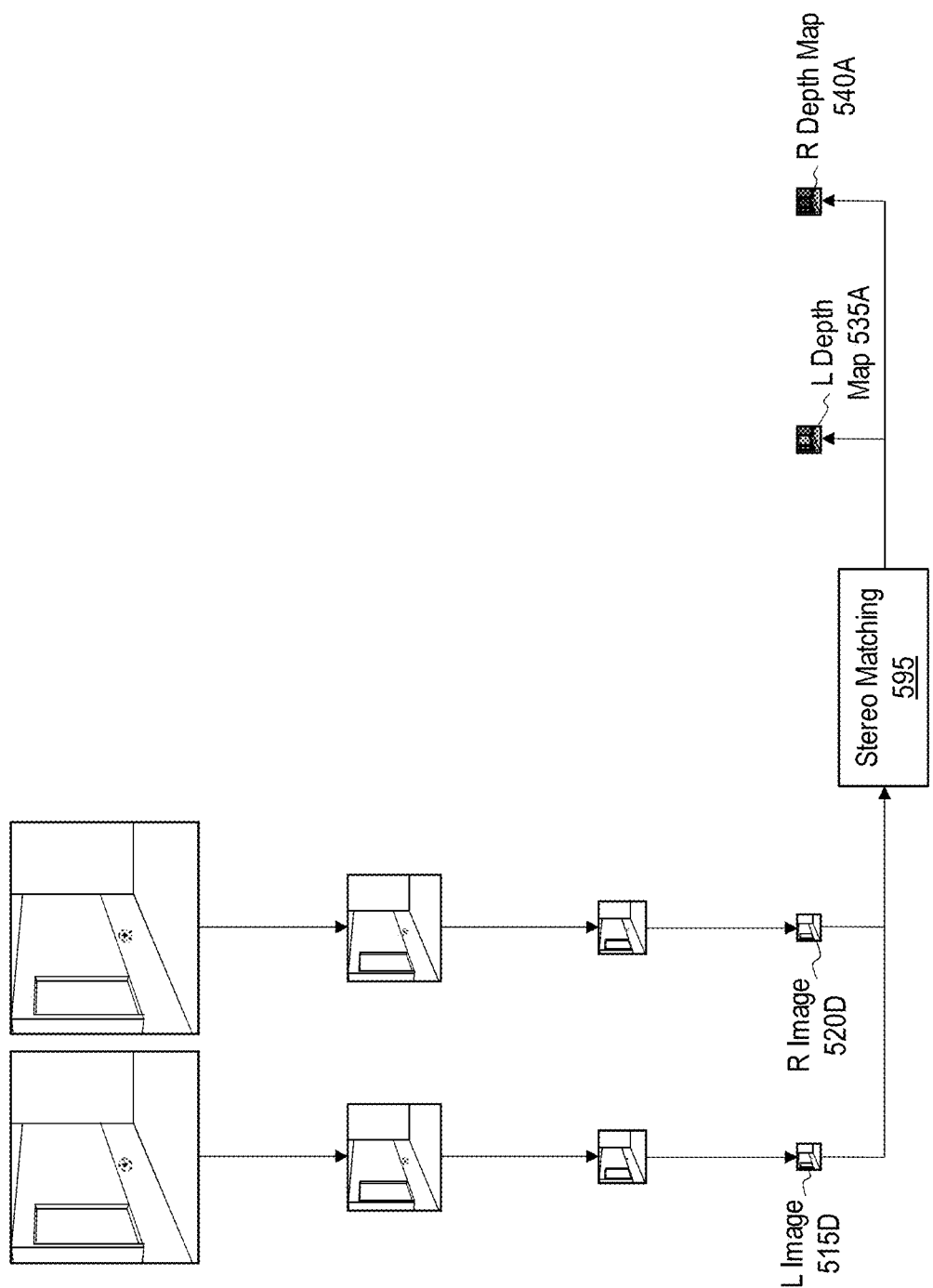

SYSTEMS AND METHODS FOR TEMPORALLY CONSISTENT DEPTH MAP GENERATION

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Many mixed-reality systems include a depth detection system (e.g., time of flight camera, rangefinder, stereoscopic depth cameras, etc.). A depth detection system provides depth information about the real-world environment surrounding the mixed-reality system to enable the system to accurately present mixed-reality content (e.g., holograms) with respect to real-world objects. As an illustrative example, a depth detection system is able to obtain depth information for a real-world table positioned within a real-world environment. The mixed-reality system is then able to render and display a virtual figurine accurately positioned on the real-world table such that the user perceives the virtual figurine as though it were part of the user's real-world environment.

A mixed-reality system may also employ cameras of a depth detection system, such as stereo cameras, for other purposes. For example, a mixed-reality system may utilize images obtained by stereo cameras to provide a pass-through view of the user's environment to the user. A pass-through view can aid users in avoiding disorientation and/or safety hazards when transitioning into and/or navigating within an immersive mixed-reality environment.

Furthermore, in some instances, a mixed-reality system includes stereo cameras of various modalities to provide views of a user's environment that enhance the user's understanding of their real-world environment. For example, a mixed-reality system that includes long wavelength thermal imaging cameras may allow a user (e.g., a first responder) to see through smoke, haze, fog, and/or dust. In another example, a mixed-reality system that includes low light imaging cameras may allow a user (e.g., a first responder) to see in dark environments where the ambient light level is below the level required for human vision.

A mixed-reality system can present views captured by stereo cameras to users in a variety of ways. The process of using images captured by world-facing cameras to provide three-dimensional views of a real-world environment to a user creates many challenges.

Initially, the physical positioning of the stereo cameras is physically separated from the physical positioning of the user's eyes. Thus, directly providing the images captured by the stereo cameras to the user's eyes would cause the user to perceive the real-world environment incorrectly. For example, a vertical offset between the positioning of the user's eyes and the positioning of the stereo cameras can cause the user to perceive real-world objects as vertically offset from their true position with respect to the user. In another example, a difference in the spacing between the user's eyes and the spacing between the stereo cameras can cause the user to perceive real-world objects with incorrect depth.

The difference in perception between how the cameras observe an object and how a user's eyes observe an object is often referred to as the "parallax problem" or "parallax error." FIG. 1 illustrates a conceptual representation of the parallax problem in which a stereo pair of cameras 105A and 105B is physically separated from a user's eyes 110A and 110B. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 110B.

The cameras 105A and 105B and the user's eyes 110A and 110B perceive an object 130, as indicated in FIG. 1 by the lines extending from the object 130 to the cameras 105A and 105B and the user's eyes 110A and 110B, respectively. FIG. 1 illustrates that the cameras 105A and 105B perceive the object 130 at different positions on their respective sensor regions 115A, 1105B. Similarly, FIG. 1 shows that the user's eyes 110A and 110B perceive the object 130 at different positions on their respective sensor regions 1105A, 1105B. Furthermore, the user's eyes 110A perceives the object 130 at a different position on sensor region 1105A than camera 105A, and the user's eye 110B perceives the object 130 at a different position on sensor region 1105B than camera 105B.

Some approaches for correcting for the parallax problem involve performing a camera reprojection from the perspective of the stereo cameras to the perspective of the user's eyes. For instance, some approaches involve performing a calibration step to determine the differences in physical positioning between the stereo cameras and the user's eyes. Then, after capturing a timestamped pair of stereo images with the stereo cameras, a step of calculating depth information (e.g., a depth map) based on the stereo pair of images is performed (e.g., by performing stereo matching). Subsequently, a system can reproject the calculated depth information to correspond to the perspective of the user's left eye and right eye.

However, calculating and processing depth information based on a stereo pair of images, particularly when addressing the parallax problem, is associated with many challenges. For example, performing stereo matching to generate a depth map based on a stereo pair of images is a computationally expensive and/or time-consuming process. In some instances, the complexity of a depth calculation is a product of the number of pixels in the image frames and the number of disparity calculations to be performed. Thus, conventional mixed-reality systems may struggle to generate depth maps without significant latency, particularly where the underlying stereo pair of images has high image resolution. The latency in calculating depth maps also delays operations that rely on depth information (e.g., parallax error correction), resulting in a poor user experience.

In addition, conventional stereo matching algorithms provide depth maps with imprecise depth borders between foreground and background objects (e.g., depth borders). The lack of quality in depth maps generated by conventional stereo matching algorithms can degrade the smoothness and/or precision of a parallax-corrected images displayed to the user.

Furthermore, temporal inconsistencies often arise under conventional stereo matching algorithms. For example, in some instances, stereo cameras of a mixed-reality system iteratively capture stereo pairs of images of the real-world environment as the user's pose changes with respect to the environment. Under conventional stereo matching algorithms, discrepancies often exist in the depth information for real-world objects that are represented in sequentially generated depth maps based on sequentially captured stereo pairs of images that were captured at different user poses (even for slight variations in user pose). Such discrepancies, or temporal inconsistencies, can give rise to artifacts (e.g., depth flickers) from frame to frame in parallax-corrected images displayed to the user.

For at least the foregoing reasons, there is an ongoing need and desire for improved techniques and systems for calculating and processing depth information, particularly for systems that need to resolve parallax problems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for temporally consistent depth map generation.

Disclosed systems include one or more processors and one or more hardware storage devices having stored computer-executable instructions that are operable, when executed by the one or more processors, to cause the systems to perform acts associated with performing temporally consistent depth map generation.

In some embodiments, the disclosed methods include acts of obtaining a first stereo pair of images of a scene associated with a first timepoint and a first pose, generating a first depth map of the scene based on the first stereo pair of images, obtaining a second stereo pair of images of the scene associated with a second timepoint and a second pose, generating a reprojected first depth map by reprojecting the first depth map to align the first depth map with the second stereo pair of images and using the reprojected first depth map while generating a second depth map that corresponds to the second stereo pair of images.

As described herein, at least some disclosed embodiments are operable to facilitate improved temporal consistency of the first depth map with the second depth map, and overall depth map quality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5B illustrates a conceptual representation of generating a depth map by performing stereo matching on a downsampled stereo pair of images;

DETAILED DESCRIPTION

Figure 1:
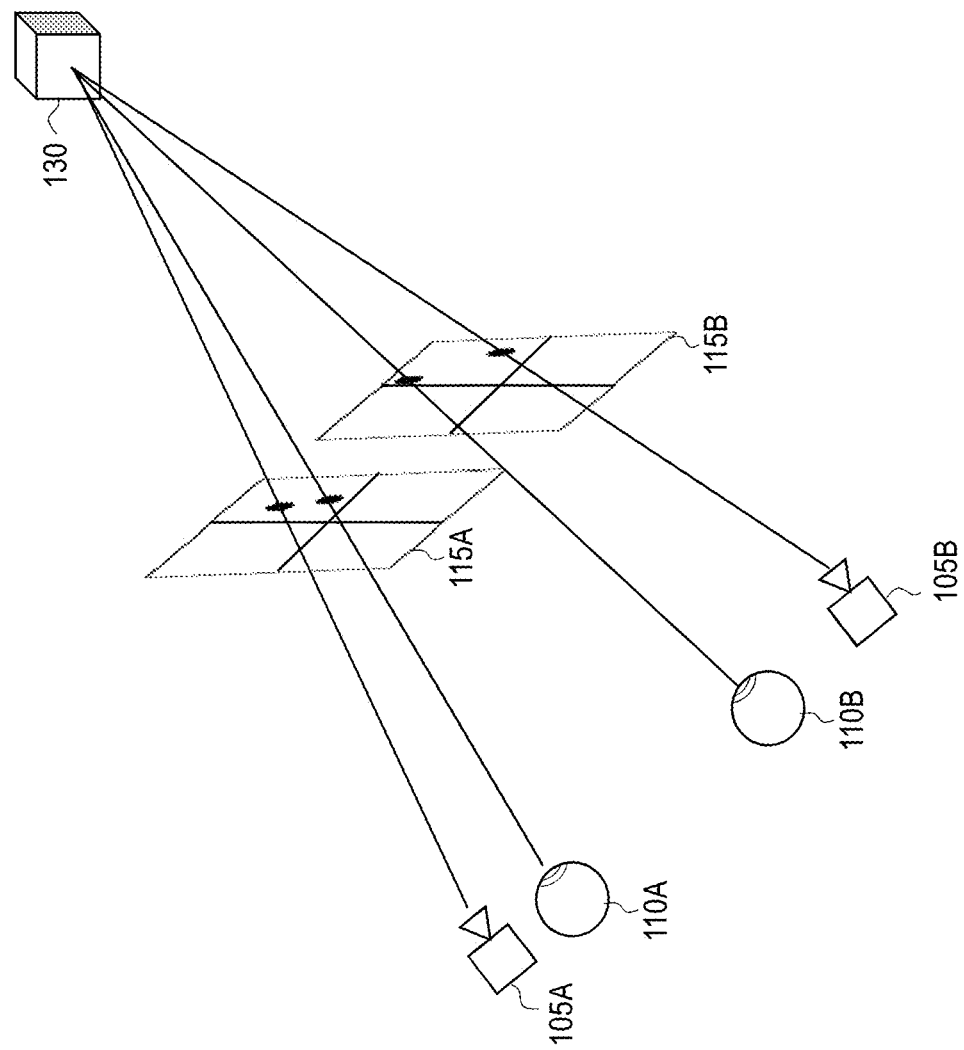
FIG. 1 illustrates an example of the parallax problem that occurs when cameras have a different perspective than a user's eyes.

Disclosed embodiments include systems and methods for facilitating temporally consistent depth map generation.

In some instances, temporally consistent depth map generation is performed by a system that includes one or more processors and one or more hardware storage devices having stored computer-executable instructions that are operable, when executed by the one or more processors, to cause the system to perform acts associated with temporally consistent depth map generation.

In some embodiments, the acts associated with temporally consistent depth map generation include obtaining a first stereo pair of images of a scene associated with a first timepoint and a first pose, generating a first depth map of the scene based on the first stereo pair of images, obtaining a second stereo pair of images of the scene associated with a second timepoint and a second pose, generating a reprojected first depth map by reprojecting the first depth map to align the first depth map with the second stereo pair of images and generating a second depth map with the reprojected first depth map which corresponds to the second stereo pair of images.

Examples of Technical Benefits, Improvements, and Practical Applications

Those skilled in the art will recognize, in view of the present disclosure, that at least some of the disclosed embodiments may address various shortcomings associated with generating depth maps, particularly for low-latency operations such as providing parallax-corrected pass-through images. The following section outlines some example improvements and/or practical applications provided by the disclosed embodiments. It will be appreciated, however, that the following are examples only and that the embodiments described herein are in no way limited to the example improvements discussed herein.

For instance, by using a reprojected depth map associated with a prior timepoint for generating a depth map for a subsequent timepoint, the disclosed embodiments are able to create improvements in temporal consistency between the disparity values represented in consecutively generated depth maps. This temporal consistency for consecutively generated depth maps further facilitates smooth and/or precise depth-dependent operations, such as parallax error correction. For instance, by providing temporal consistency across consecutively generated depth maps it is possible for the disclosed embodiments to facilitate a reduction in the incidence of depth flickers and/or other artifacts that may arise in parallax-corrected frames that rely on the consecutively generated depth maps.

In addition, by utilizing reprojected prior depth maps to generate subsequent depth maps, the disclosed embodiments enable error compensation performed for the prior depth map to persist through to subsequent depth maps. By way of non-limiting example, many stereo matching algorithms are prone to disparity calculation errors when calculating disparities for horizontal structures present in the scene (e.g., because horizontal structures run parallel to the scanlines for calculating disparity). For head-mounted displays (HMDs) users may tilt their head to cause horizontal structures in the scene to span several scanlines, enabling more accurate disparity calculation for the horizontal structures in the scene.

Conventionally, however, when a user returns their head to its initial tilt, the stereo matching algorithm may again fail to accurately calculate disparity values for the horizontal structures in the scene. In contrast, at least some of the stereo matching principles of the present disclosure may provide temporal consistency between consecutively captured depth maps. Continuing with the above example, disparity calculations obtained according to the present disclosure for horizontal structures in a scene while a user tilts heir head may persist (e.g., carry through) to subsequent depth maps for a significant time period, even after the user returns their head to its initial tilt.

Additionally, by providing temporal consistency between consecutively generated depth maps, the disclosed embodiments enable improvements in the accuracy of the depth maps to carry through from frame to frame. For example, for HMDs, a user's pose may slightly vary over time, even while the user focuses on a single portion of a real-world environment. Small variations in pose may cause the perspective represented in captured stereo pairs of images to vary slightly from frame to frame. Slightly varied perspectives may enable a stereo matching algorithm to more accurately calculate disparity for different portions of the scene from frame to frame. However, in conventional systems, incidental and/or localized accuracy gains in stereo matching only exist on a per-frame basis. In contrast, the disclosed embodiments that provide temporal consistency for consecutively generated depth maps enable incidental and/or localized accuracy gains to persist or carry over from frame to frame, thereby improving the depth estimation of the scene over time.

Having just described some of the various high-level features and benefits of the disclosed embodiments, attention will now be directed to FIGS. 2 through 11. These Figures illustrate various conceptual representations, architectures, methods, and supporting illustrations related to systems and methods for depth map generation. The disclosure will then turn to FIG. 12, which presents an example computer system that may include and/or be used to facilitate the disclosed principles.

Example Mixed-Reality Systems and HMDs

Figure 2:
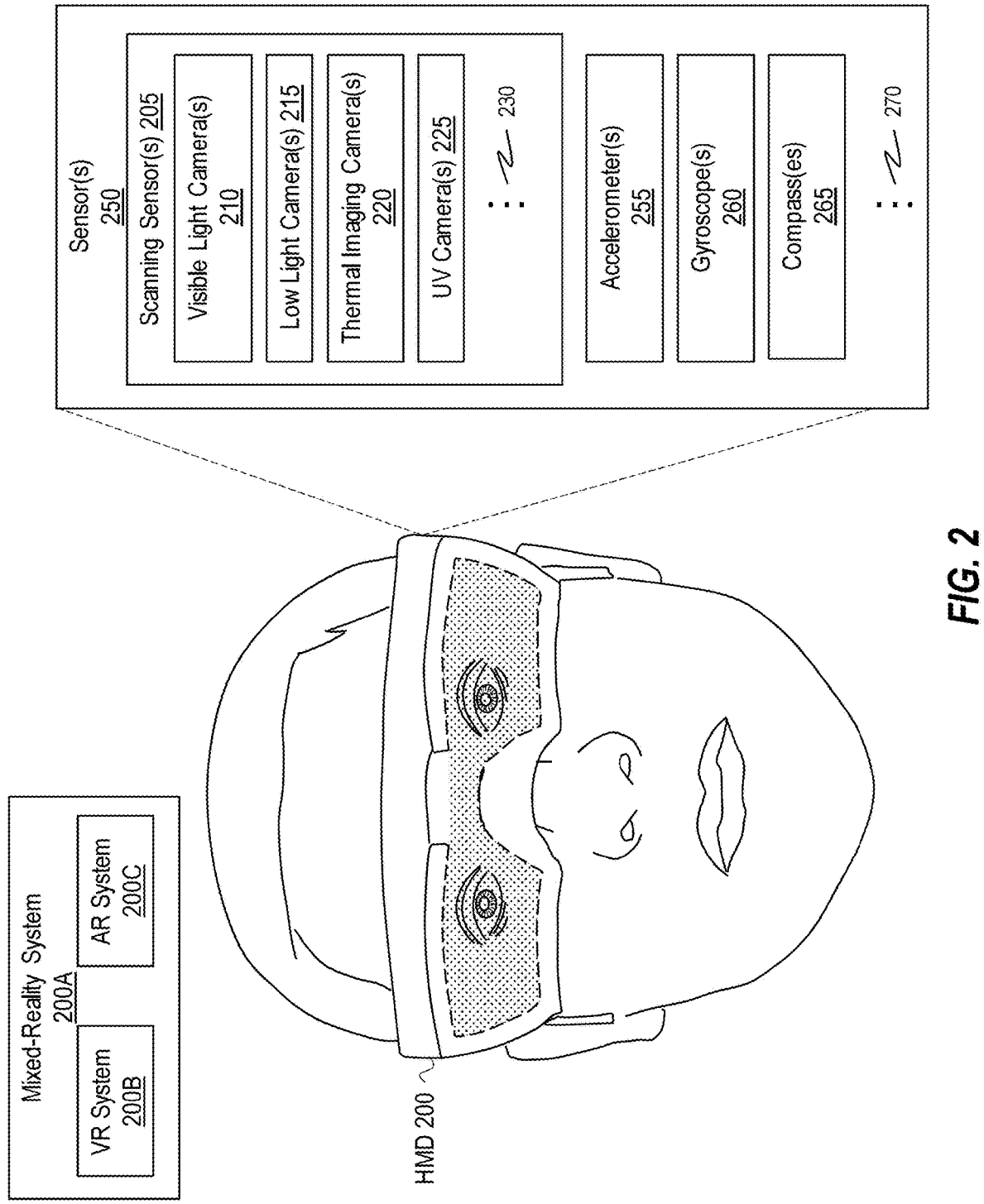
FIG. 2 illustrates an example mixed-reality system that may include or be used to implement disclosed embodiments.

Attention will now be directed to FIG. 2, which illustrates an example of a head-mounted device (HMD) 200. HMD 200 can be any type of mixed-reality system 200A (MR system), including a VR system 200B or an AR system 200C. It should be noted that while a substantial portion of this disclosure is focused, in some respects, on the use of an HMD, the embodiments are not limited to being practiced using only an HMD. That is, any type of system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

FIG. 2 illustrates HMD 200 as including sensor(s) 250, including scanning sensor(s) 205 and other sensors, such as accelerometer(s) 255, gyroscope(s) 260, compass(es) 265. The ellipsis 270 conveys that the sensor(s) 250 depicted in FIG. 2 are illustrative only and non-limiting. For instance, in some implementations, an HMD 200 includes other interoceptive and/or exteroceptive sensors not explicitly illustrated in FIG. 2, such as eye tracking systems, radio-based navigation systems, microphones, and/or other sensing apparatuses.

The accelerometer(s) 255, gyroscope(s) 260, and compass(es) 265 are configured to measure inertial tracking data. Specifically, the accelerometer(s) 255 is/are configured to measure acceleration, the gyroscope(s) 260 is/are configured to measure angular velocity data, and the compass(es) 265 is/are configured to measure heading data. The inertial tracking components of the HMD 200 (i.e., the accelerometer(s) 255, gyroscope(s) 260, and compass(es) 265) may operate in concert with visual tracking systems (e.g., cameras) to form a head tracking system that generates pose data for the HMD 200.

For example, visual-inertial Simultaneous Location and Mapping (SLAM) in an HMD 200 fuses (e.g., with a pose filter) visual tracking data obtained by one or more cameras (e.g., head tracking cameras) with inertial tracking data obtained by the accelerometer(s) 255, gyroscope(s) 260, and compass(es) 265 to estimate six degree of freedom (6DOF) positioning (i.e., pose) of the HMD 200 in space and in real time. 6DOF refers to positioning/velocity information associated with three perpendicular directional axes and the three rotational axes (often referred to as pitch, yaw, and roll) about each of the three perpendicular directional axes (often referred to as x, y, and z).

In some instances, the visual tracking system(s) of an HMD 200 (e.g., head tracking cameras) is/are implemented as one or more dedicated cameras. In other instances, the visual tracking system(s) is/are implemented as part of a camera system that performs other functions (e.g., as part of one or more cameras of the scanning sensor(s) 205, described hereinbelow).

The scanning sensor(s) 205 comprise any type of scanning or camera system, and the HMD 200 can employ the scanning sensor(s) 205 to scan environments, map environments, capture environmental data, and/or generate any kind of images of the environment. For example, in some instances, the HMD 200 is configured to generate a 3D representation of the real-world environment or generate a "passthrough" visualization. Scanning sensor(s) 205 may comprise any number or any type of scanning devices, without limit.

In accordance with the disclosed embodiments, the HMD 200 may be used to generate a parallax-corrected passthrough visualization of the user's environment. As described earlier, a "passthrough" visualization refers to a visualization that reflects what the user would see if the user were not wearing the HMD 200, regardless of whether the HMD 200 is included as a part of an AR system or a VR system. To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique.

To convert a raw image into a passthrough image, the scanning sensor(s) 205 typically rely on its cameras (e.g., head tracking cameras, hand tracking cameras, depth cameras, or any other type of camera) to obtain one or more raw images of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images, and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations may also enhance the user's ability to view objects within his/her environment (e.g., by displaying additional environmental conditions that may not have been detectable by a human eye).

It should be noted that while a portion of this disclosure focuses on generating "a" passthrough image, the implementations described herein may generate a separate passthrough image for each one of the user's eyes. That is, two passthrough images are typically generated concurrently with one another. Therefore, while frequent reference is made to generating what seems to be a single passthrough image, the implementations described herein are actually able to simultaneously generate multiple passthrough images.

In some embodiments, scanning sensor(s) 205 include visible light camera(s) 210, low light camera(s) 215, thermal imaging camera(s) 220, and potentially (though not necessarily) ultraviolet (UV) cameras 225. The ellipsis 230 demonstrates how any other type of camera or camera system (e.g., depth cameras, time of flight cameras, etc.) may be included among the scanning sensor(s) 205. As an example, a camera structured to detect mid-infrared wavelengths may be included within the scanning sensor(s) 205.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras may be implemented as stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Disparities are measured after applying rectification to the stereo pair of images such that corresponding pixels in the images that commonly represent an object in the environment are aligned along scanlines. After rectification, corresponding pixels in the different images that commonly represent an object in the environment only differ in one dimension (e.g., the direction of the scanlines, such as the horizontal direction). The one-dimensional difference between corresponding pixels in their respective images of the stereo pair of images represents the disparity value for the object represented by the corresponding pixels.

Based on these pixel disparities, the embodiments are able to determine depths for objects located within the overlapping region (i.e. "stereoscopic depth matching," "stereo depth matching," or simply "stereo matching"). As such, the visible light camera(s) 210 can be used to not only generate passthrough visualizations, but they can also be used to determine object depth. In some embodiments, the visible light camera(s) 210 can capture both visible light and IR light.

Those skilled in the art will recognize, in view of the present disclosure, that stereo matching may be performed on a stereo pair of images obtained by any type and/or combination of cameras. For example, an HMD 200 or other system may comprise any combination of visible light camera(s) 210, low light camera(s) 215, thermal imaging camera(s) 220, UV camera(s) 225, and/or other cameras to capture a stereo pair of images upon which to perform stereo matching (e.g., for the overlapping region of the stereo pair of images).

The low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the visible light camera(s) 210 and the low light camera(s) 215 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 210 are low power cameras and operate in environments where the illuminance is between about 10 lux and about 100,000 lux, or rather, the illuminance range begins at about 10 lux and increases beyond 10 lux. In contrast, the low light camera(s) 215 consume more power and operate in environments where the illuminance range is between about 1 milli-lux and about 10 lux.

The thermal imaging camera(s) 220, on the other hand, are structured to detect electromagnetic radiation or IR light in the far-IR (i.e. thermal-IR) range, though some implementations also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns. Because the thermal imaging camera(s) 220 detect far-IR radiation, the thermal imaging camera(s) 220 can operate in any illuminance condition, without restriction.

In some cases (though not necessarily all), the thermal imaging camera(s) 220 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 10 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking (e.g., as referenced above with reference to visual-inertial SLAM). These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera types. The different camera types include, but are not limited to, visible light cameras, low light cameras, thermal imaging cameras, and UV cameras.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera type(s) 245. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
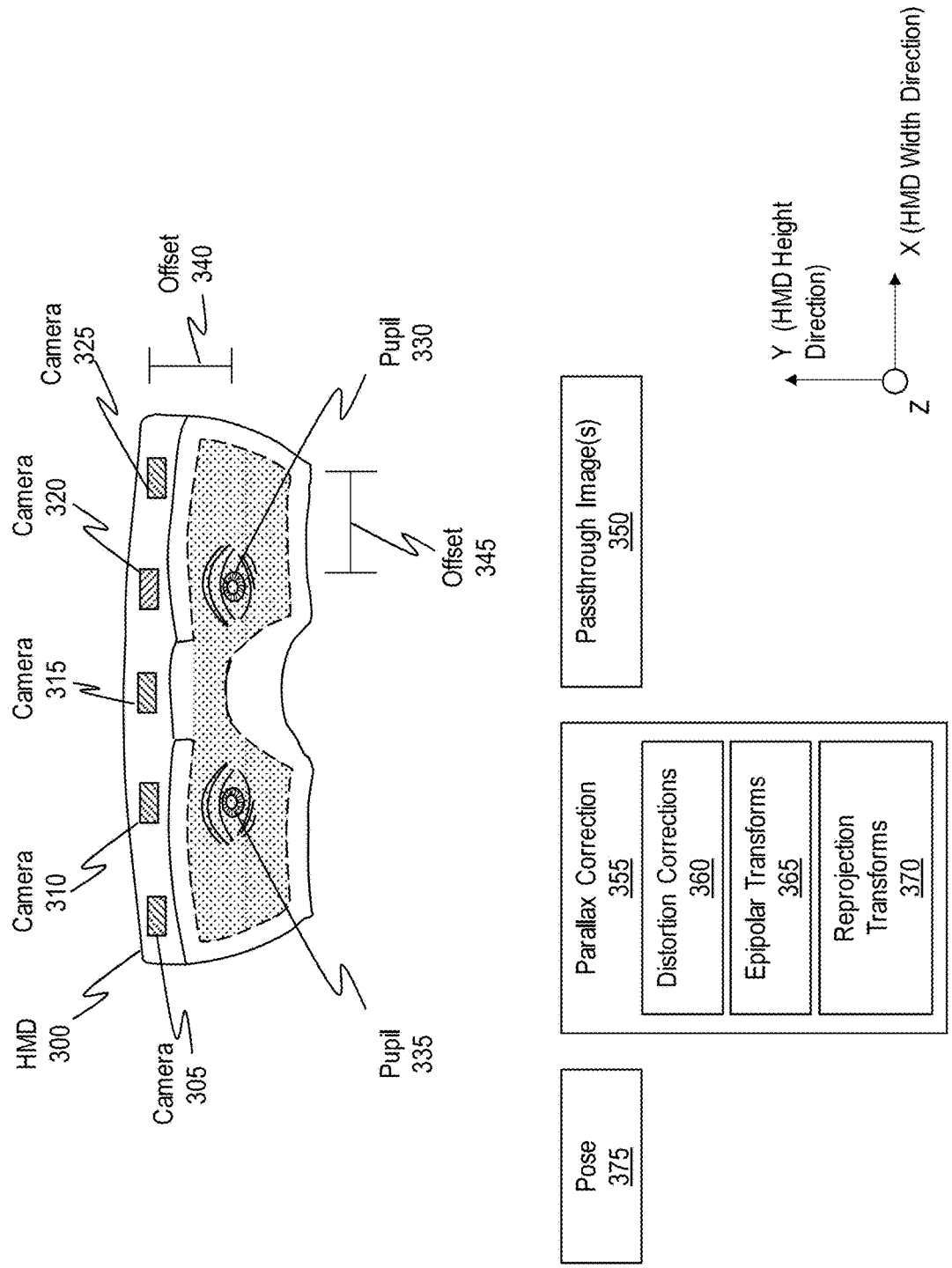
FIG. 3 illustrates example structural configurations of components of an example mixed-reality system, as well as an example of a parallax correction operation.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or fewer than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) 350 for the user of HMD 300 to view. In doing so, HMD 300 is able to provide a visualization of the real world without requiring the user to remove or reposition HMD 300. These passthrough image(s) 350 effectively represent the same view the user would see if the user were not wearing HMD 300. In some instances, the HMD 300 employs at least some of cameras 305-325 to provide these passthrough image(s) 350.

None of the cameras 305-325, however, are directly aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images produced by the cameras 305-325 are not available for immediate use as passthrough image(s) 350. Instead, it is beneficial to perform a parallax correction 355 (aka an image synthesis or reprojection) on the raw images to transform (or reproject) the perspectives embodied within those raw images to correspond to perspectives of the user's pupils 330 and 335. The parallax correction 355 includes any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils). The parallax correction 355 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current pose 375 of the HMD 300 relative to its surrounding environment (e.g., as determined via visual-inertial SLAM). Based on the pose 375 and the depth maps that are generated, the HMD 300 and/or other system is/are able to correct parallax error by reprojecting a perspective embodied by the raw images to coincide with a perspective of the user's pupils 330 and 335.

By performing these different transforms, the HMD 300 is able to perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the pose 375. Based on these depth computations and pose 375, the HMD 300 is able to three-dimensionally reproject or three-dimensionally warp the raw images in such a way so as to preserve the appearance of object depth in the passthrough image(s) 350, where the preserved object depth substantially matches, corresponds, or visualizes the actual depth of objects in the real world. Accordingly, the degree or amount of the parallax correction 355 is at least partially dependent on the degree or amount of the offsets 340 and 345.

By performing the parallax correction 355, the HMD 300 effectively creates "virtual" cameras having positions that are in front of the user's pupils 330 and 335. By way of additional clarification, consider the position of camera 305, which is currently above and to the left of the pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were positioned in front of pupil 335.

Although the present disclosure focuses, in some respects, on depth map generation for performing parallax error correction, it should be noted that at least some of the principles described herein are applicable to any implementation that involves generating a depth map and/or relies on depth map generation. By way of non-limiting example, at least some of the principles disclosed herein may be employed in hand tracking (or tracking other real-world objects), stereoscopic video streaming, building surface reconstruction meshes, and/or other applications.

Low Compute Depth Map Generation

Figure 4:
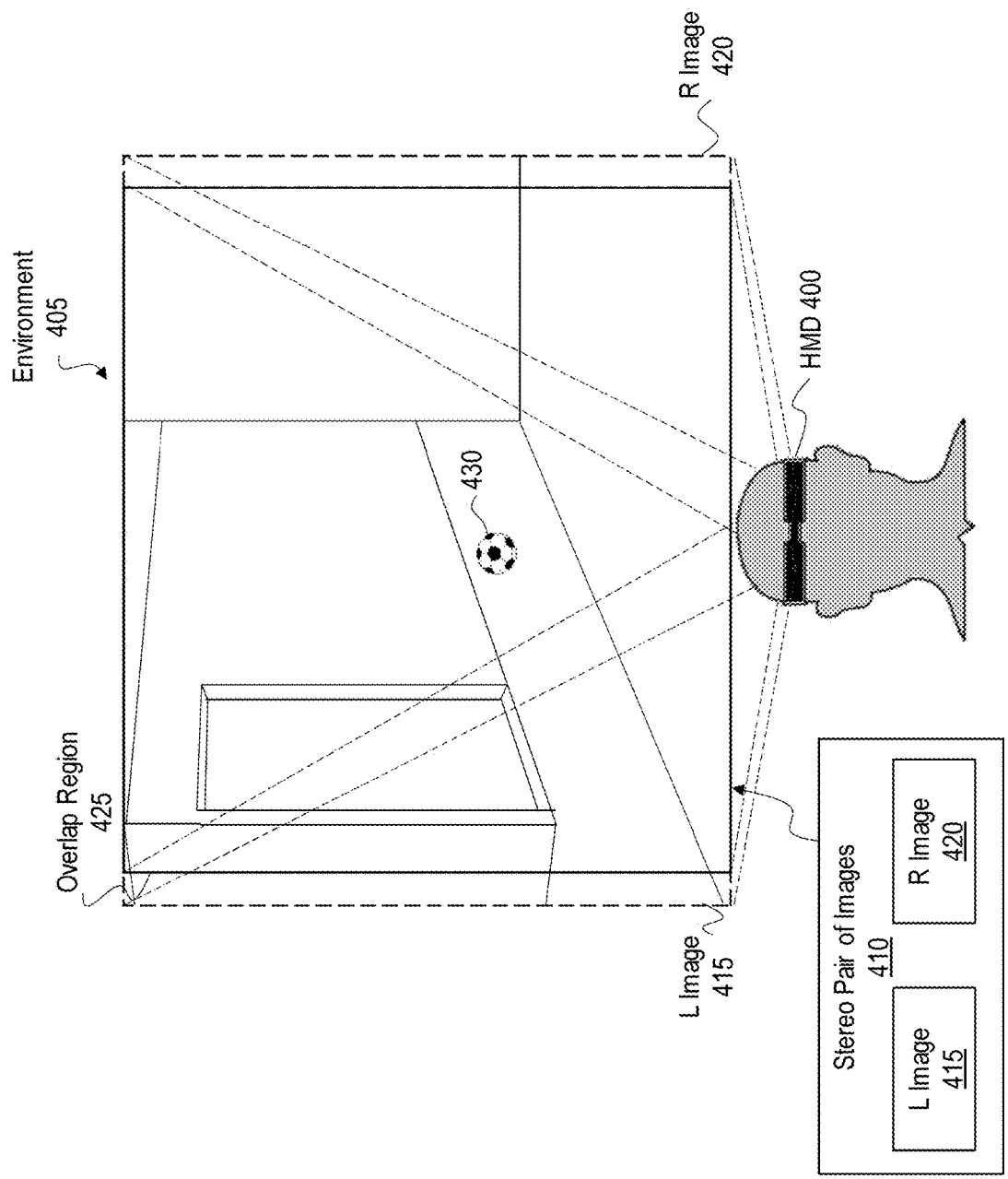
FIG. 4 illustrates capturing an environment using a stereo camera pair to obtain a stereo pair of images of an environment.

Attention is now directed to FIG. 4, which illustrates an HMD 400 capturing an environment 405. As used herein, "scene" and "environment" are used interchangeably and refer broadly to any real-world space comprising any arrangement and/or type of real-world objects. As used herein, "mixed-reality environment" refers to any real-world environment that includes virtual content implemented therein/thereon (e.g., holograms of an AR environment), or any immersive virtual environment that only includes virtual content (e.g., a VR environment). One will recognize that virtual content can include virtual representations of real-world objects.

The HMD 400 is representative of the HMD 200 referred to in FIG. 2. As such, the HMD 400 utilizes scanning sensor(s) 205 to capture the environment 405. The instance depicted in FIG. 4 shows the HMD 400 utilizing stereo cameras (e.g., a left camera and a right camera) to capture a stereo pair of images 410 of the environment 405, including a left image 415 and a right image 420 of the environment 405. The left image 415 and the right image 420 cover an overlap region 425 in which the left image 415 and the right image 420 each include corresponding pixels that represent common portions and/or objects of the environment 405. For example, both the left image 415 and the right image 420 include pixels that represent the ball 430 positioned within the environment 405.

In some instances, a system (e.g., HMD 400) rectifies the stereo pair of images 410 and performs depth calculations, such as stereo matching, to generate depth information for the portions of the environment 405 represented within the overlap region 425.

As noted hereinabove, the stereo cameras of the HMD 400 may include any type and/or modality of camera, such as visible light camera(s) 210, low light camera(s) 215, thermal imaging camera(s) 220, or any other type of camera or combinations thereof. One will recognize, in view of the present disclosure, that the designations of "left" and "right" for the stereo cameras are somewhat arbitrary and not limiting of the present disclosure in any way, and that other configurations are within the scope of this disclosure (e.g., a top camera and a bottom camera).

In some instances, the HMD 400 utilizes the stereo pair of images 410 captured by the stereo cameras to provide a parallax-corrected pass-through view of the environment 405. The image quality of the parallax-corrected pass-through view of the environment 405 may increase with the resolution of the stereo pair of images 410 (e.g., the left image 415 and the right image 420) captured by the stereo cameras.

However, generating a depth map from the stereo pair of images 410 for performing parallax correction is computationally expensive. In many instances, the complexity of a depth calculation is proportional to the number of pixels in the stereo pair of images and the number of disparity calculations to be performed. Accordingly, performing depth computations (e.g., stereo matching) on a high-resolution stereo pair of images can be particularly computationally intensive, which may cause high latency in performing any operations that depend on depth information (e.g., parallax correction).

Accordingly, at least some embodiments of the present disclosure provide for depth map generation in a low compute manner.

Figure 5A:
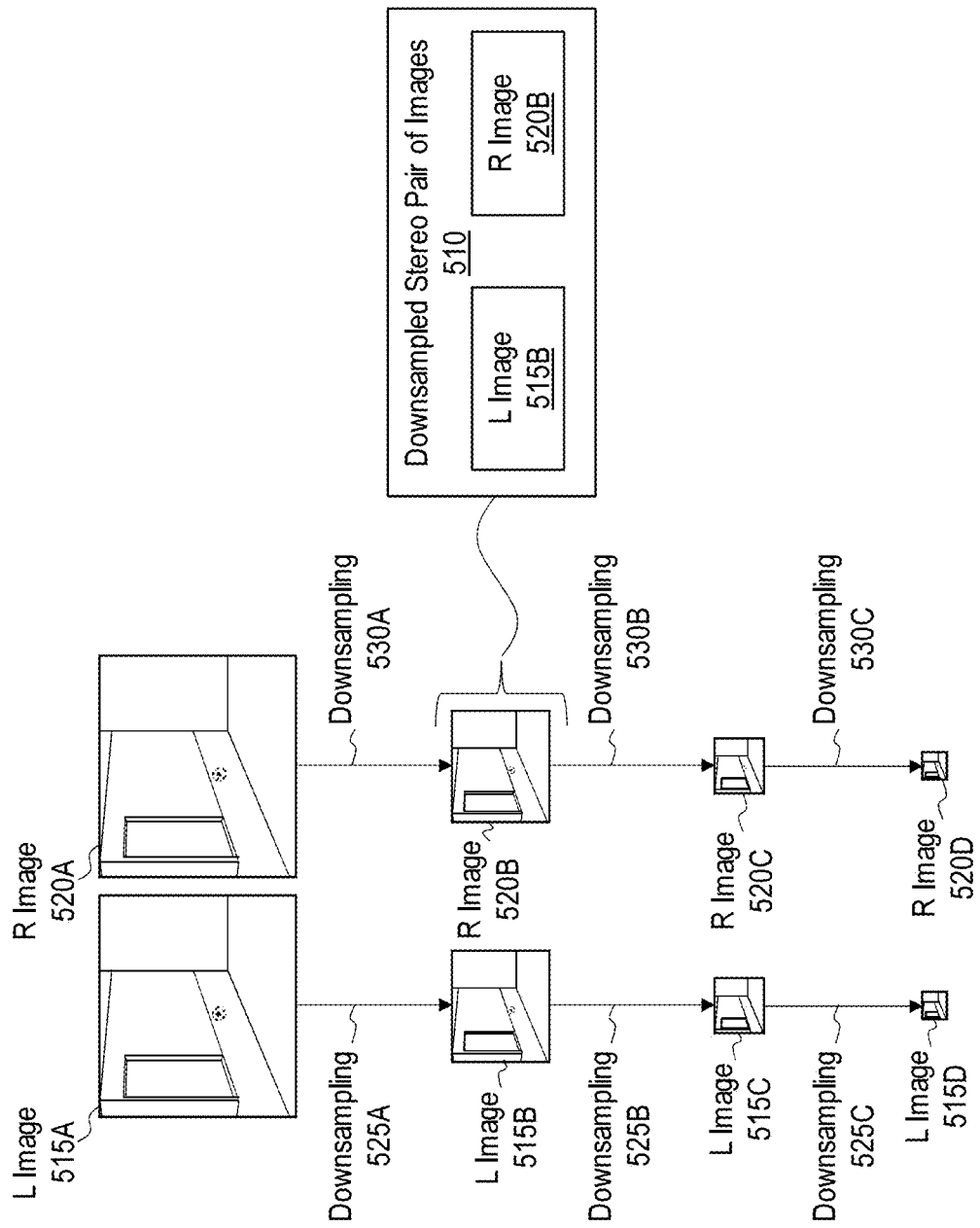
FIG. 5A illustrates a conceptual representation of generating a downsampled stereo pair of images.

Pursuant to generating a depth map in a low compute manner, FIG. 5A illustrates a conceptual representation of generating a downsampled stereo pair of images 510. FIG. 5A shows left image 515A, which is representative of left image 415 shown and described with reference to FIG. 4, and right image 520A, which is representative of right image 420 shown and described with reference to FIG. 4. In some instances, left image 515A and right image 520A are high-resolution images with enough pixels to represent the captured environment (e.g., environment 405 from FIG. 4) with a desired level of precision (e.g., to provide pass-through images of the environment). However, as noted above, performing stereo matching on high-resolution images to generate depth information for the captured environment is associated with many challenges.

Accordingly, FIG. 5A illustrates a downsampling operation 525A performed on the left image 515A and a downsampling operation 530A on the right image 520A. The downsampling operation 525A reduces the image size and pixel resolution of the left image 515A. Similarly, the downsampling operation 530A reduces the image size and pixel resolution of the right image 520A. Thus, performing the downsampling operations 525A and 530A on the left image 515A and the right image 520A, respectively, generates a downsampled stereo pair of images 510, which includes a downsampled left image 515B and a downsampled right image 520B.

In some implementations, downsampling operations 525A and 530A comprise reducing sections of pixels in an original image (e.g., left image 515A and right image 520A) to a single pixel in the downsampled image (e.g., downsampled left image 515B and downsampled right image 520B). For example, in some instances, each pixel in the downsampled image is defined by a pixel of the original image:

$$p_d(m,n)=p(Km,Kn)$$

where $p_d$ is the pixel in the downsampled image, p is the pixel in the original image, K is a scaling factor, m is the pixel coordinate in the horizontal axis, and n is the pixel coordinate in the vertical axis. In some instances, the downsampling operations 525A and 530A also include prefiltering functions for defining the pixels of the downsampled image, such as anti-aliasing prefiltering to prevent aliasing artifacts.

In some implementations, downsampling operations 525A and 530A utilize an averaging filter for defining the pixels of the downsampled image (e.g., downsampled left image 515B and downsampled right image 520B) based on the average of a section of pixels in the original image (e.g., left image 515A and right image 520A. In one example of downsampling by a factor of 2 along each axis, each pixel in the downsampled image is defined by an average of a 2×2 section of pixels in the original image:

$$p_d(m,n) = \frac{[p(2m, 2n) + p(2m, 2n+1) + p(2m+1, 2n) + p(2m+1, 2n+1)]}{4}$$

where $p_d$ is the pixel in the downsampled image, p is the pixel in the original image, m is the pixel coordinate in the horizontal axis, and n is the pixel coordinate in the vertical axis.

As noted above, in some instances, the downsampling operations 525A and 530A reduce the pixel resolution of the left image 515A and the right image 520A by a factor of 2 in both the horizontal axis and the vertical axis, such that the downsampled left image 515B and the downsampled right image 520B are one fourth the size of the left and right images 515A and 520A. Thus, in many instances, performing stereo matching using the downsampled stereo pair of images 510 is less computationally expensive than performing stereo matching using the original left image 515A and right image 520A. Accordingly, performing stereo matching using the downsampled stereo pair of images 510 may reduce the latency associated with generating depth maps.

For example, reducing the pixel resolution by a factor of 2 in both the horizontal axis and the vertical axis reduces the number of pixels present in the stereo pair of images by a factor of 4 and furthermore reduces the number of disparity calculations to be performed by a factor of 4. In some instances, an additional benefit of reducing the pixel resolution of the stereo pair of images is that the search range for identifying corresponding pixels between the images is reduced. Thus, the computational complexity of performing stereo matching on the downsampled stereo pair of images 510 is reduced proportional to a factor of 16 as compared with performing stereo matching using the original, high-resolution left image 515A and right image 520A.

It should be noted that, in some instances, a downsampling operation reduces the pixel resolution by a factor that is greater than or less than 2 along each axis of the images.

Furthermore, FIG. 5A illustrates that, in some implementations, downsampling operations are performed iteratively to generate a downsampled stereo pair of images that has an even lower pixel resolution. For example, FIG. 5A depicts downsampling operation 525B applied to downsampled left image 515B, producing downsampled left image 515C with an even lower pixel resolution than downsampled left image 515B. Similarly, FIG. 5A depicts downsampling operation 530B applied to downsampled right image 520B, producing downsampled right image 520C with an even lower pixel resolution than downsampled right image 520B. In some instances, the downsampling operations 525B and 530B apply the same reduction factor as downsampling operations 525A and 530A, while in other instances the different downsampling operations apply different reduction factors.

FIG. 5A also depicts downsampling operation 525C applied to downsampled left image 515C, producing downsampled left image 515D with an even lower pixel resolution than downsampled left image 515C. Similarly, FIG. 5A depicts downsampling operation 530C applied to downsampled right image 520C, producing downsampled right image 520D with an even lower pixel resolution than downsampled right image 520C.

In some instances, performing stereo matching on the stereo pair of images that has the lowest pixel resolution (e.g., downsampled left image 515D and downsampled right image 520D) is considerably less computationally expensive and less time-consuming than performing stereo matching on the original stereo pair of images captured by the stereo cameras (e.g., stereo pair of images 410 from FIG. 4). In one illustrative, non-limiting example, the left image 515A and the right image 520A of an original stereo pair of images have an image resolution of 1280×1024. After iterative downsampling operations 525A-525C and 530A-530C that iteratively reduce image size by a factor of 2 in both image axes, the downsampled left image 515D and the downsampled right image 520D have an image resolution of 160×128, a total reduction in each axis by a factor of 8. Reducing the pixel resolution by a factor of 8 in both axes reduces the number of pixels present in the downsampled left image 515D and the downsampled right image 520D by a factor of 64, as compared with the original left image 515A and the original right image 520A. Reducing the pixel resolution by a factor of 8 in both axes reduces the number of disparity calculations to be performed for the downsampled left image 515D and the downsampled right image 520D by a factor of 64. Thus, the computational complexity of performing stereo matching on the downsampled stereo pair of images 510 is reduced proportional to a factor of 4096 as compared with performing stereo matching using the original, high-resolution left image 515A and right image 520A.

Those skilled in the art will recognize, in view of the present disclosure, that performing iterative downsampling operations provides a plurality of downsampled stereo pairs of images, including a downsampled stereo pair of images that has a lowest pixel resolution (e.g., downsampled left image 515D and downsampled right image 520D). In some instances, a system (e.g., HMD 200) utilizes the plurality of downsampled stereo pairs of images for generating upsampled stereo pairs of images, as will be described hereinafter (see FIGS. 5D, 5E, and 5G).

Although FIGS. 5A-5G focus, in some respects, on a specific number of downsampling operations, it should be noted that more or fewer downsampling operations than those explicitly shown in FIGS. 5A-5G are within the scope of this disclosure. For example, in some instances, the number of downsampling operations employed and/or the lowest pixel resolution of the downsampled stereo pairs of images is constrained by the baseline distance between the stereo cameras. A larger baseline distance between stereo cameras may correlate with larger disparity values in depth maps calculated based on stereo pairs of images captured by the stereo cameras. Accordingly, in some instances, the lowest pixel resolution of the downsampled stereo pairs of images is constrained such that the resolution of the disparity values generated when performing stereo matching is sufficient to capture larger disparity values associated with stereo cameras positioned at a large baseline distance.

Furthermore, in some implementations, the number of downsampling operations employed and/or the lowest pixel resolution of the downsampled stereo pairs of images is dynamically updated based on various factors. For example, in some instances, excessively downsampling stereo pairs of images may cause thin structures present in the environment to disappear, precluding disparity values from being calculated therefor. Accordingly, in some instances, a system (e.g., HMD 200) identifies the thinness of detectable structures present in the environment (e.g., by object segmentation) and selectively reduces or increases the number of downsampling operations to be performed based on the thinness of the detectable structures.

FIG. 5B illustrates a conceptual representation of generating a depth map by performing stereo matching on a downsampled stereo pair of images. Specifically, FIG. 5B shows a stereo matching operation 595 being performed on the downsampled left image 515D and the downsampled right image 520D. As noted above, in some instances, stereo matching involves identifying disparity values for corresponding pixels of different images of a rectified stereo pair of images that commonly represent an object captured by both images.

The stereo matching algorithm of the implementation depicted in FIG. 5B provides a left depth map 535A and a right depth map 540A. The left depth map 535A corresponds to the geometry of the downsampled left image 515D, such that structures represented in the left depth map 535A spatially align with the same structures represented in the downsampled left image 515D. Similarly, the right depth map 540A corresponds to the geometry of the downsampled right image 520D, such that structures represented in the right depth map 540A spatially align with the same structures represented in the downsampled right image 520D.

In some instances, providing depth maps in the geometry of both images used for stereo matching enhances user experience for parallax-corrected pass-through views by enabling per-eye parallax corrective reprojections to be performed. However, other applications that depend on depth information experience little or no benefit from multiple depth maps for the same stereo pair of images, such as object or hand tracking, generating or updating a surface reconstruction mesh, etc. Thus, in some embodiments, the stereo matching operation 595 provides only a single depth map.

In some instances, the low pixel resolution of the left depth map 535A and the right depth map 540A renders them undesirable for some depth-dependent applications (e.g., generating parallax-error corrected pass-through images). Thus, at least some embodiments of the present disclosure involve generating upsampled depth maps based on the depth maps generated by performing stereo matching on a downsampled stereo pair of images.

Figure 5C:
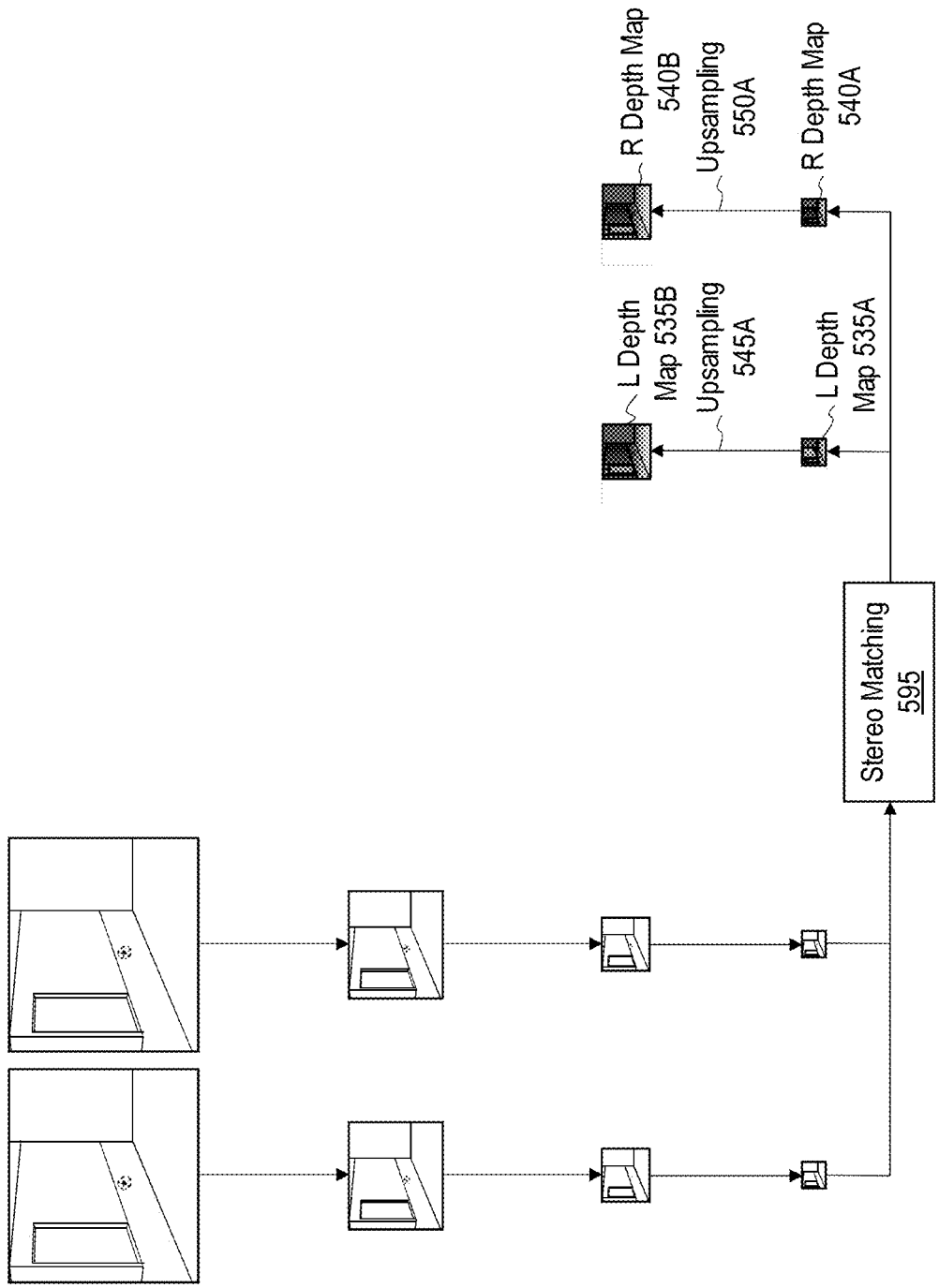
FIG. 5C illustrates a conceptual representation of performing an upsampling operation on a depth map.

FIG. 5C illustrates a conceptual representation of performing an upsampling operation on a depth map. FIG. 5C shows generating an upsampled left depth map 535B by performing an upsampling operation 545A on left depth map 535A. FIG. 5C also shows generating an upsampled right depth map 540B by performing an upsampling operation 550A on right depth map 540A. The upsampling operations 545A and 550A cause the upsampled left depth map 535B and the upsampled right depth map 540B to have a higher image resolution than the left depth map 535A and the right depth map 540A.

In some instances, the upsampling operations 545A and 550A increase the pixel resolution of the left depth map 535A and the right depth map 540A by a factor of 2 in both the horizontal axis and the vertical axis, such that the upsampled left depth map 535B and the upsampled right depth map 540B are four times the size of the left and right depth maps 535A and 540A. However, in some instances, a upsampling operation increases the pixel resolution by a factor that is greater than or less than 2 along each axis of the depth maps.

The upsampling operations 545A and 550A may comprise various upsampling techniques to generate the upsampled depth maps, such as, for example, nearest-neighbor interpolation (pixel replication), bilinear or bicubic interpolation, machine learning-based solutions (e.g., utilizing a deep convolutional neural network), and/or other techniques. In some instances, the upsampling operations 545A and 550A also implement reconstruction filtering to prevent artifacts.

However, conventional upsampling techniques often produce upsampled images that smooth over edges that were previously well-defined in the original image. In some instances, such smoothing would cause an upsampled depth map (e.g., upsampled left depth map 535B or upsampled right depth map 540B) to have imprecise depth borders, which may degrade user experiences that depend on accurate depth information, such as parallax-corrected pass-through experiences.

Thus, in some embodiments, generating an upsampled depth map involves performing both an upsampling function and an edge-preserving filtering function. In some instances, the edge-preserving filtering is performed subsequent to the upsampling function. For example, FIG. 5D illustrates a conceptual representation of performing an edge-preserving filtering operation on a depth map that has been upsampled.

Figure 5D:
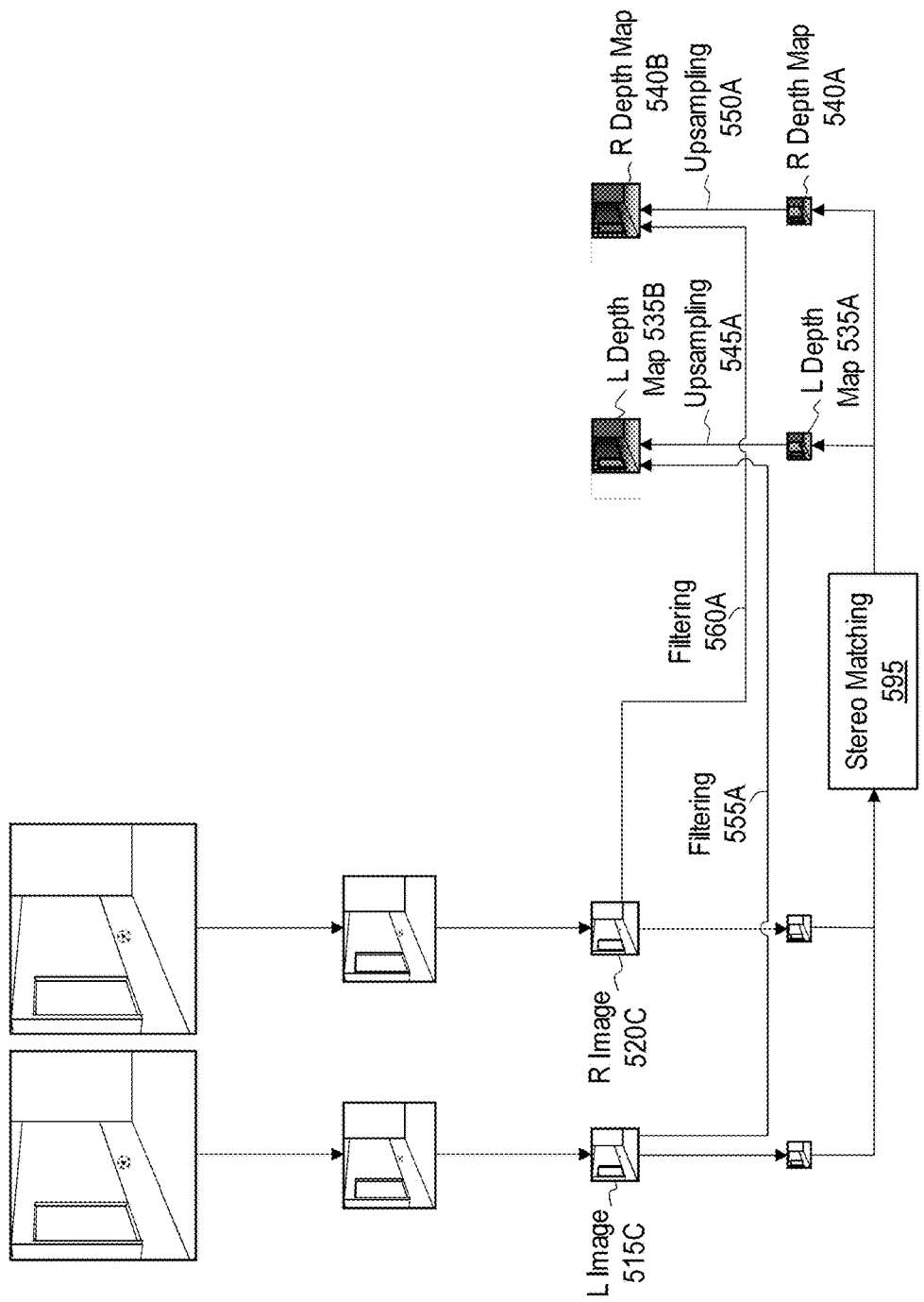
FIG. 5D illustrates a conceptual representation of performing an edge-preserving filtering operation on an upsampled depth map.

Initially, according to FIG. 5D, the upsampling operations 545A and 550A cause the upsampled left depth map 535B and the upsampled right depth map 540B to have an image resolution that corresponds to the image resolution of downsampled left image 515C and downsampled right image 520C. Furthermore, in some instances, camera images such as the downsampled left image 515C and the downsampled right image 520C, often include desirable edge definition as compared with depth maps derived from camera images.

Thus, FIG. 5D depicts a filtering operation 555A being performed on upsampled left depth map 535B. In some instances, the filtering operation 555A is an edge-preserving filtering operation that uses a guidance image, such as, by way of nonlimiting example, a joint bilateral filter, a guided filter, a bilateral solver, or any other suitable filtering technique.

As indicated above, in some instances, the left depth map(s) (e.g., left depth map 535A and upsampled left depth map 535B) correspond(s) to the geometry of the left images (e.g., left image 515A, downsampled left images 515B-515D). Accordingly, in some implementations, the filtering operation 555A utilizes the downsampled left image 515C as a guidance image and obtains edge data from the downsampled left image 515C. The filtering operation 555A uses the edge data to refine the edges (e.g., depth borders) represented in the upsampled left depth map 535B. The filtering operation 555A, in some embodiments, also smooths the upsampled left depth map 535B while preserving the edges (e.g., depth borders) thereof.

Similarly, FIG. 5D depicts a filtering operation 560A being performed on upsampled right depth map 540B. The right depth map(s) (e.g., right depth map 540A and upsampled right depth map 540B) correspond(s) to the geometry of the right images (e.g., right image 520A, downsampled right images 520B-520D). Accordingly, in some implementations, the filtering operation 560A utilizes the downsampled right image 520C as a guidance image and obtains edge data from the downsampled right image 520C. The filtering operation 560A uses the edge data to refine the edges (e.g., depth borders) represented in the upsampled right depth map 540B. The filtering operation 560A, in some embodiments, also smooths the upsampled right depth map 540B while preserving the edges (e.g., depth borders) thereof.

In some implementations, generating the upsampled left depth map 535B and the upsampled right depth map 540B by applying upsampling operations 545A and 550A and filtering operations 555A and 560A provides depth maps that have precise depth borders and high overall depth map quality (as compared, for example, with a hypothetical depth map generated by performing stereo matching directly on downsampled left image 515C and downsampled right image 520C).

Figure 5E:
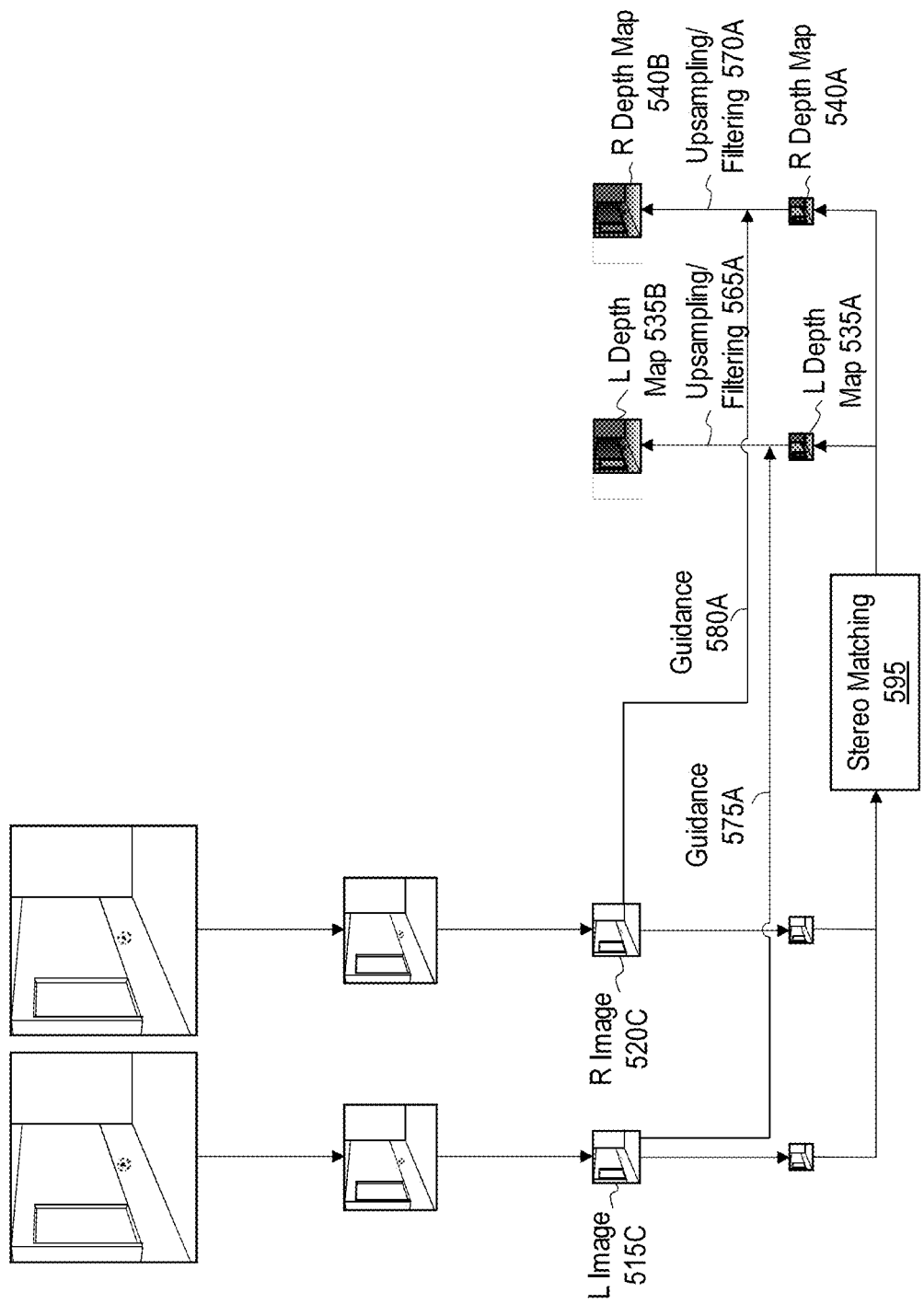
FIG. 5E illustrates a conceptual representation of generating an upsampled depth map by performing a combined upsampling and filtering operation.

In some instances, as described above with reference to FIG. 5D, the filtering operations 555A and 560A are performed subsequent to the upsampling operations 545A and 550A, respectively. However, in some instances, the filtering functions and the upsampling functions are performed as a single operation. For example, FIG. 5E illustrates generating upsampled left depth map 535B by performing an upsampling and filtering operation 565A that obtains guidance data 575A from the downsampled left image 515C. In some implementations, because the downsampled left image 515C has a higher image resolution than the left depth map 535A, applying the downsampled left image 515C as a guidance image for filtering left depth map 535A with upsampling and filtering operation 565A causes the left depth map 535A to be upsampled to correspond with the image resolution of the downsampled left image 515C.

FIG. 5E also illustrates generating upsampled right depth map 540B by performing an upsampling and filtering operation 570A that obtains guidance data 580A from the downsampled right image 520C. In some instances, the upsampling and filtering operations 565A and 570A are similar to the filtering operations 555A and 565A described hereinabove (e.g., an edge-preserving filter that utilizes a guidance image, such as a joint bilateral filter).

Those skilled in the art will recognize, in view of the present disclosure, that in some embodiments the system (e.g., HMD 200) only generates a single upsampled depth map utilizing an upsampling operation and an edge-preserving filtering operation that uses data from a corresponding right image, a corresponding left image, or a combination thereof.

Figure 9:
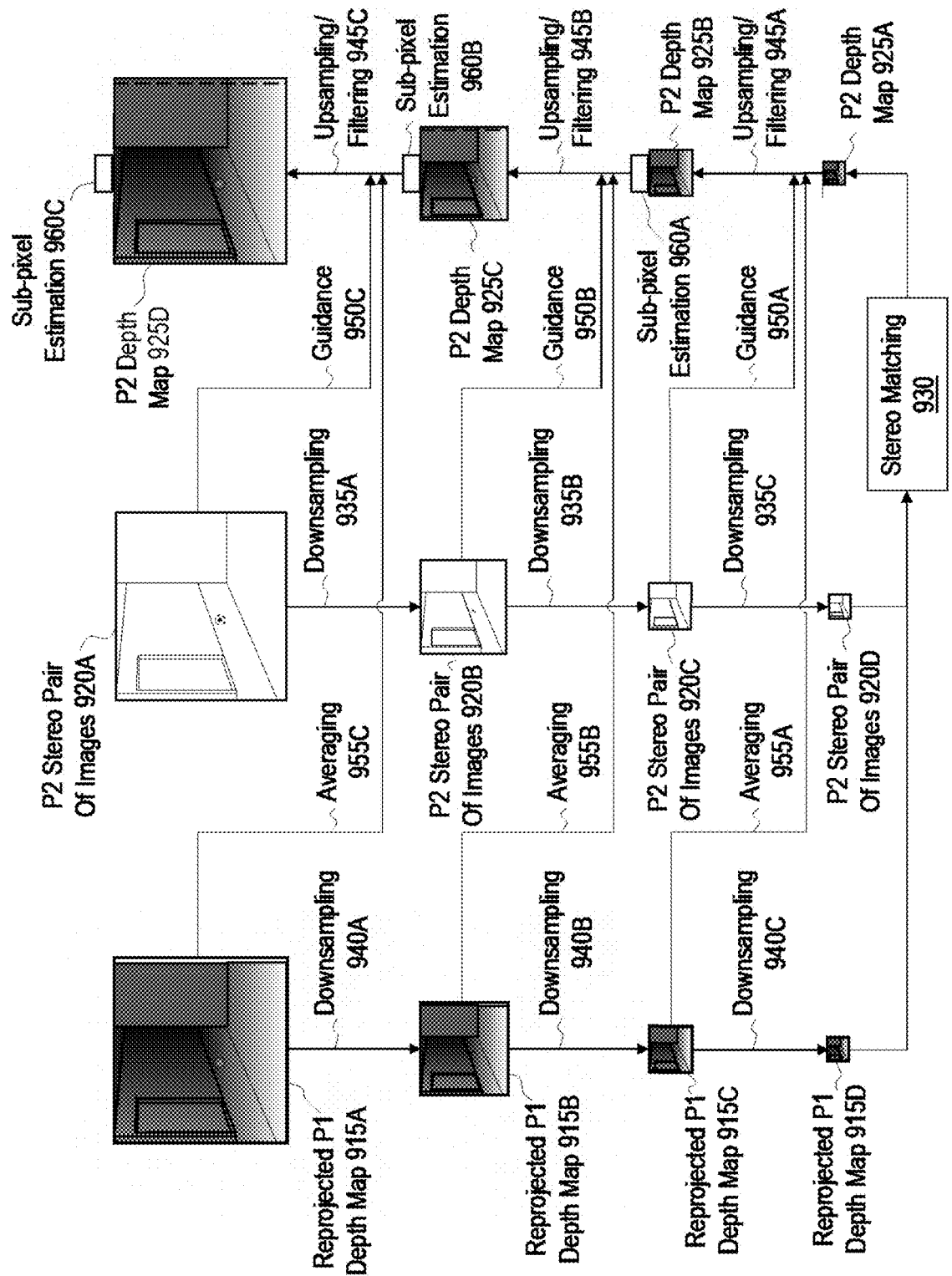
FIG. 9 illustrates a conceptual representation of generating upsampled depth maps by performing upsampling and filtering operations that use reprojected depth maps.

Furthermore, in some instances, the filtering operation(s) also utilize(s) other image data sources not explicitly shown in FIGS. 5D and 5E for filtering upsampled depth maps, such as depth maps associated with prior stereo pairs of images and/or timepoints (see FIG. 9 and attendant description).

In addition, one will appreciate, in view of the present disclosure, that the guidance image for generating an upsampled depth map need not be a downsampled stereo pair of images. For example, in the case where a system (e.g., HMD 200) performs only a single downsampling operation to generate a single downsampled stereo pair of images, the filtering operation employed by the system to generate an upsampled depth map may use image data from the original stereo pair of images as filter guidance. In such cases, the upsampled depth map may correspond in size to at least one image of the original stereo pair of images.

Figure 5F:
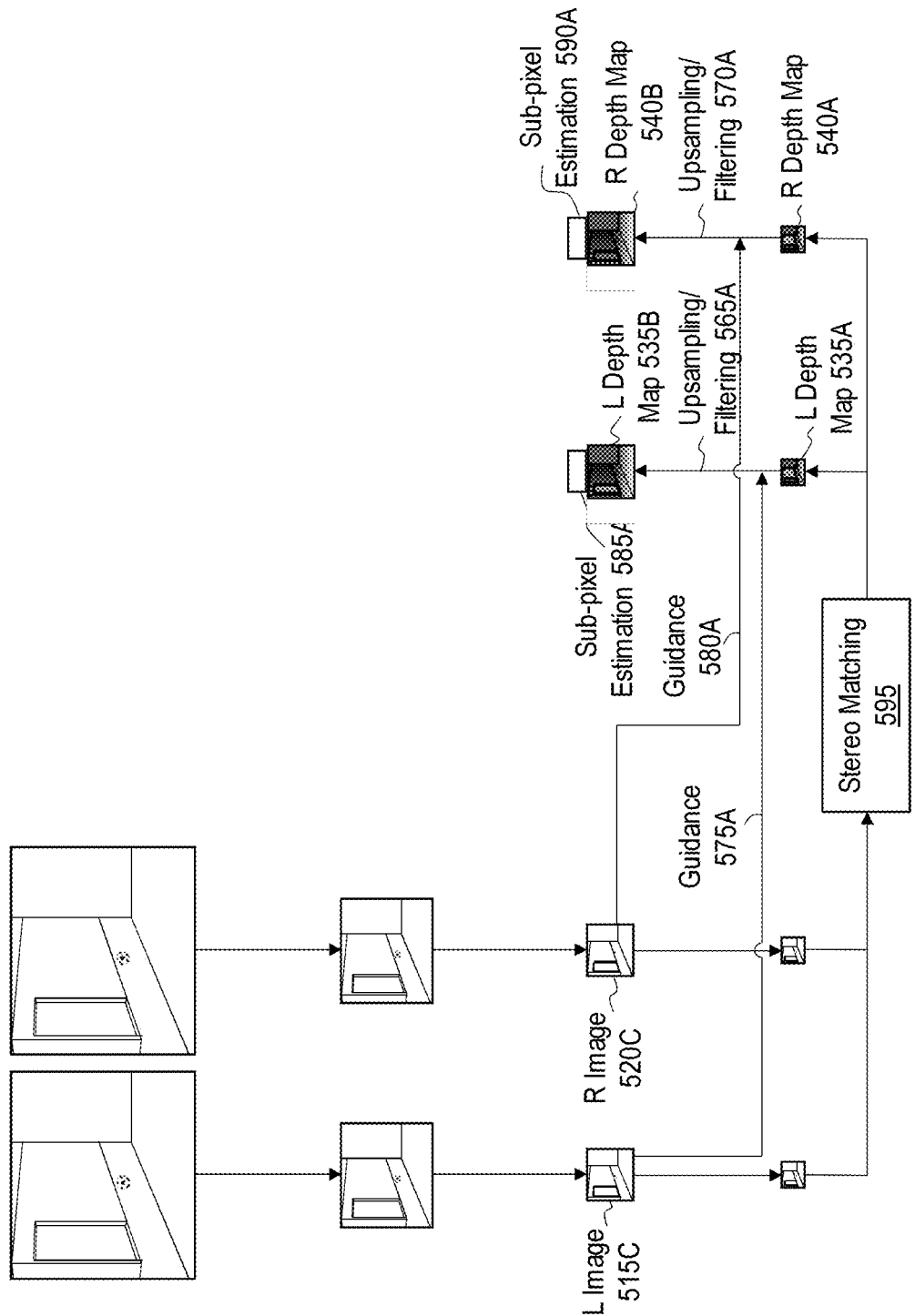
FIG. 5F illustrates a conceptual representation of performing sub-pixel estimation on an upsampled depth map.

Attention is now directed to FIG. 5F, which illustrates a conceptual representation of performing sub-pixel estimation on an upsampled depth map. Initially, as noted above, stereo matching algorithms typically calculate disparity based on the one-dimensional difference in pixel coordinates of corresponding pixels in different rectified images that described the same object in the captured environment. Stereo matching algorithms typically provide disparity values as integers based on the difference in pixel coordinates between the corresponding pixels. However, in some instances, true disparity is more accurately represented with applicable fractional values.

Furthermore, in some instances, the precision of the disparity values obtained by performing the stereo matching operation 595 on a downsampled stereo pair of images (e.g., downsampled left image 515D and downsampled right image 520D) is low. For example, the pixel resolution for describing objects in the downsampled stereo pair of images is lower than the pixel resolution for describing the same objects in the high-resolution stereo pair of images. Accordingly, the number of disparity values available to describe the depth of an object represented in a depth map are lower for the downsampled stereo pair of images than for the high-resolution stereo pair of images.

Accordingly, FIG. 5F illustrates that, in some instances, a system (e.g., HMD 200) applies sub-pixel estimation operations 585A and 590A to the upsampled left depth map 535B and the upsampled right depth map 540B, respectively. Although not specifically shown (for clarity), a system (e.g., HMD 200) may also apply sub-pixel estimations on the left depth map 535A and the right depth map 540A before generating the upsampled left depth map 535B and the upsampled right depth map 540B.

In some implementations, the sub-pixel estimation operations 585A and 590A estimate the applicable fractional values associated with the disparities calculated by the stereo matching operation 595, thereby improving the precision of the upsampled depth maps 535B and 540B. In some instances, performing sub-pixel estimation operations 585A and 590A prevents disparity imprecision from compounding or carrying through multiple upsampling operations (see FIG. 5G). Sub-pixel estimation operations 585A and 590A may employ various techniques, such as, for example, area-based matching, similarity interpolation, intensity interpolation, gradient-based methods, phase correlation, geometric methods, etc.

Figure 5G:
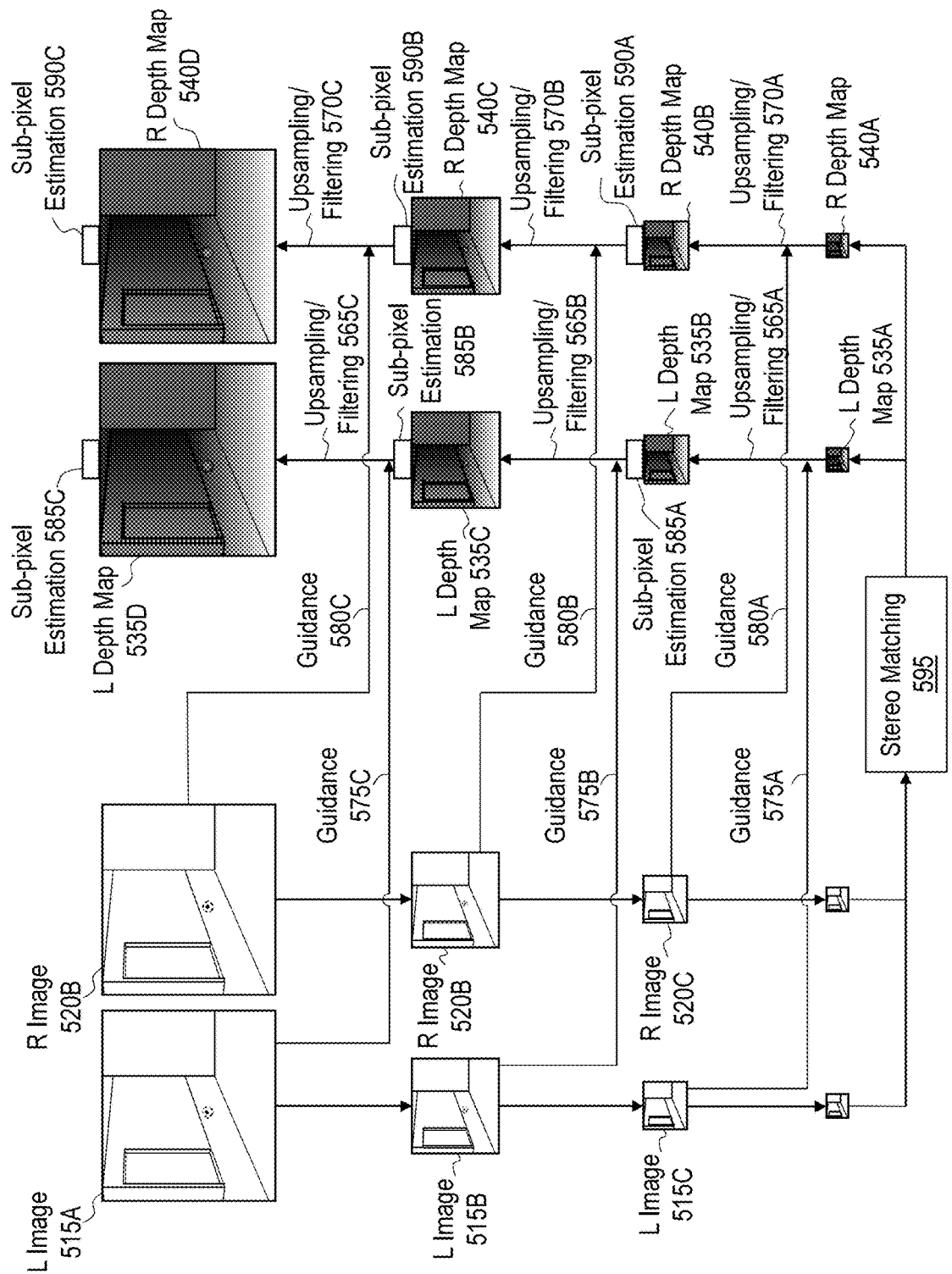
FIG. 5G illustrates a conceptual representation of generating a high-resolution depth map by iteratively performing upsampling, filtering, and performing sub-pixel estimation operations on depth maps.

FIG. 5G illustrates that, in some implementations, upsampling and filtering operations are performed iteratively to generate upsampled depth maps with a desired level of image resolution. For example, FIG. 5G depicts upsampling and filtering operation 565B applied to upsampled left depth map 535B, producing upsampled left depth map 535C with higher pixel resolution than upsampled left depth map 535B. In some instances, the upsampling and filtering operation 565B utilizes guidance data 575B from downsampled left image 515B for generating upsampled left depth map 535C, and upsampled left depth map 535C has an image resolution that corresponds to that of downsampled left image 515B.

Similarly, FIG. 5G depicts upsampling and filtering operation 570B applied to upsampled right depth map 540B, producing upsampled right depth map 540C with a higher pixel resolution than upsampled right depth map 540B. In some instances, the upsampling and filtering operation 570B utilizes guidance data 580B from downsampled right image 520B for generating upsampled right depth map 540C, and upsampled right depth map 540C has an image resolution that corresponds to that of downsampled right image 520B.

Furthermore, FIG. 5G shows sub-pixel estimation operations 585B and 590B applied to upsampled left depth map 535C and upsampled right depth map 540C, respectively.

FIG. 5G also depicts upsampling and filtering operation 565C applied to upsampled left depth map 535C using guidance data 575C from left image 515A (of the originally captured stereo pair of images 410, see FIG. 4), producing upsampled left depth map 535D. Similarly, FIG. 5G depicts upsampling and filtering operation 570C applied to upsampled right depth map 540C using guidance data 580C from right image 520A (of the originally captured stereo pair of images 410, see FIG. 4), producing upsampled right depth map 540D. FIG. 5G also illustrates sub-pixel estimation operations 585C and 590C applied to upsampled left depth map 535D and upsampled right depth map 540D, respectively.

In this regard, in some embodiments, a system (e.g., HMD 200) utilizes iterative upsampling and filtering operations (e.g., upsampling and filtering operations 565A-565C and 570A-570C) to generate one or more upsampled depth maps (e.g., upsampled left depth map 535D and upsampled left depth map 540D) that have an image resolution that corresponds to the image resolution of the originally captured stereo pair of images (e.g., left image 515A and right image 520A). In some instances, performing iterative downsampling operations to generate a downsampled stereo pair of images, performing stereo matching on the downsampled stereo pair of images, and performing iterative upsampling and filtering operations (and, optionally, iterative sub-pixel estimation operations) provides a high-resolution depth map (e.g., upsampled left depth map 535D and/or upsampled right depth map 540D) at less computational cost (and, potentially, with higher depth map quality and/or depth border precision) than generating a high-resolution depth map by performing stereo matching directly on a high-resolution stereo pair of images (e.g., left image 515A and right image 520A). Accordingly, at least some of the disclosed embodiments may operate to provide depth maps at reduced computational cost, thereby enabling reduced latency in depth map computation.

Although FIGS. 5A-5G focus, in some respects, on generating a pair of upsampled depth maps (e.g., upsampled left depth map 535D and upsampled right depth map 540D), those skilled in the art will recognize, in view of the present disclosure, that at least some of the principles described herein are applicable for generating a single upsampled depth map (e.g., in the geometry of a left or right image of a stereo pair of images, or in any other geometry).

Furthermore, although FIGS. 5A-5G illustrate performing iterative upsampling and filtering operations generate upsampled depth maps (e.g., upsampled left depth map 535D and upsampled right depth map 540D) that have an image resolution that corresponds to that of the originally captured stereo pair of images (e.g., left image 515A and right image 520A), it should be noted that, in some implementations, the upsampling and filtering operations provide a final upsampled depth map (or pair of upsampled depth maps) that has in image resolution that is lower than that of the originally captured stereo pair of images.

Applications that depend on depth information may, in many instances, still be enabled utilizing a depth map that has a lower image resolution than that of the original stereo pair of images, such as parallax error correction, hand or other object tracking, building a surface reconstruction mesh, etc. Furthermore, refraining from generating a high-resolution depth map that corresponds to the resolution of an originally captured stereo pair of images may further reduce the computational cost associated with generating depth maps.

Example Method(s) for Low Compute Depth Map Generation

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
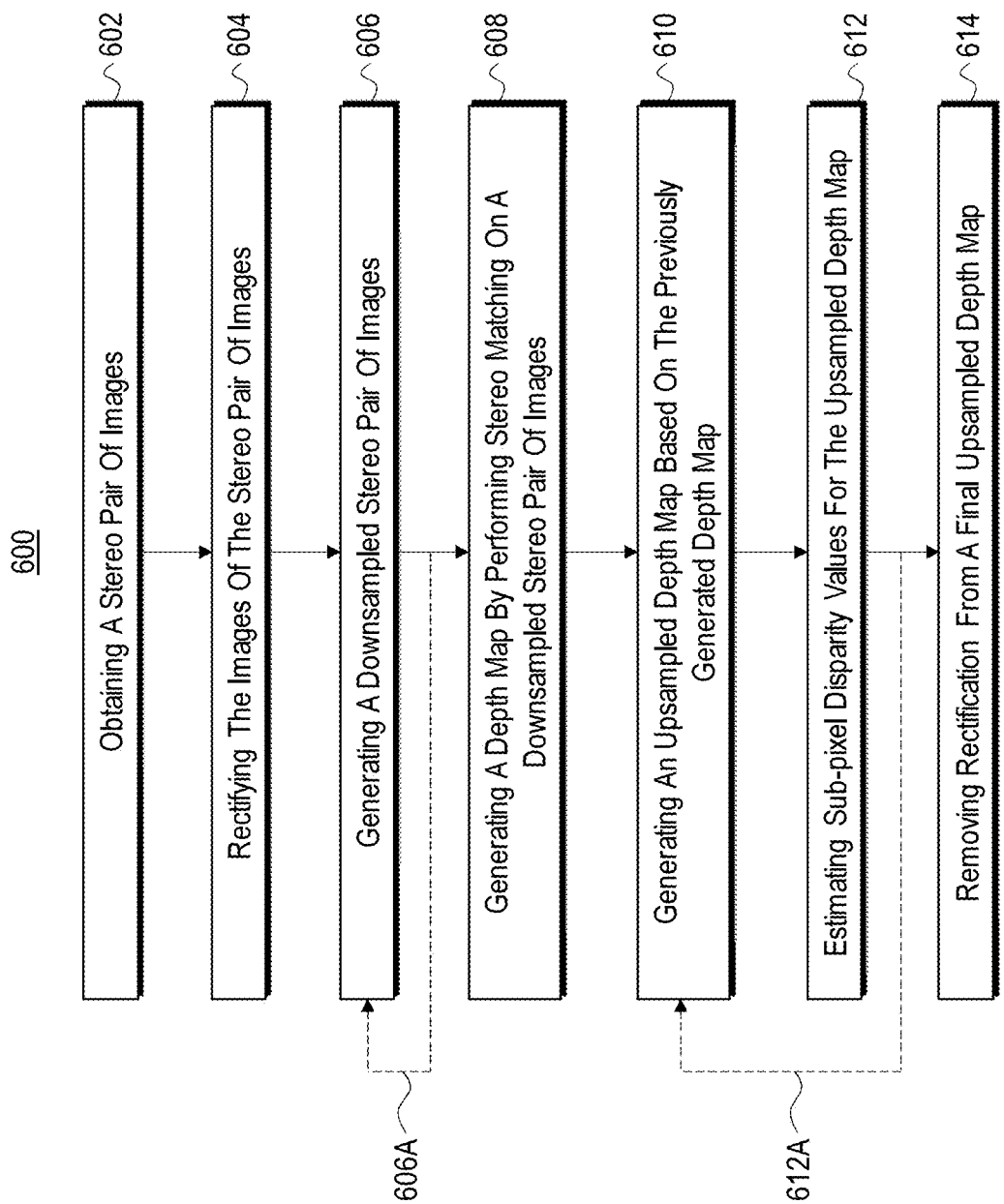
FIG. 6 illustrates an example flow diagram depicting a method for low compute depth map generation.

FIG. 6 illustrates an example flow diagram 600 that depicts various acts associated with methods for low compute depth map generation. The discussion of the various acts represented in flow diagram 600 includes references to various hardware components described in more detail with reference to FIGS. 2 and 12.

The first illustrated act is an act of obtaining a stereo pair of images (act 602). Act 602 is performed, in some instances, utilizing scanning sensor(s) 205 of an HMD 200 (see FIG. 2), such as a stereo camera pair comprising any combination of visible light camera(s) 210, low light camera(s) 215, thermal imaging camera(s) 220, UV camera(s) 225, and/or other cameras. In some instances, the stereo pair of images includes a left image and a right image that share an overlapping region in which both the left image and the right image capture common portions of an environment (e.g., stereo pair of images 410 shown in FIG. 4).

The second illustrated act is an act of rectifying the images of the stereo pair of images (act 604). In some instances, act 604 is performed utilizing one or more processors of a computer system (e.g., processor(s) 1205 of computer system 1200 shown in FIG. 12). As noted hereinabove, rectifying the images of the stereo pair of images causes corresponding pixels in the different images that commonly represent an object in the environment to only differ in one dimension (e.g., the direction of the scanlines, such as the horizontal direction), thereby enabling disparity calculations.

The third illustrated act is an act of generating a downsampled stereo pair of images (act 606). In some instances, act 606 is performed utilizing one or more processors of a computer system (e.g., processor(s) 1205 of computer system 1200 shown in FIG. 12). In some embodiments, generating a downsampled stereo pair of images comprises performing downsampling operations on a stereo pair of images to provide a downsampled stereo pair of images with a reduced image size (e.g., pixel resolution) compared to that of the original stereo pair of images (e.g., such as a reduction by a factor of at least 2). Downsampling operations can include various techniques, such as applying an averaging filter.

The dashed arrow 606A indicates that act 606 is, in some instances, performed iteratively. In some instances, after performing downsampling operations on a captured stereo pair of images to generate a downsampled stereo pair of images, a system (e.g., computer system 1200) performs downsampling operations on the downsampled stereo pair of images to generate yet another downsampled stereo pair of images with an even lower pixel resolution (see FIG. 5A).

The fourth illustrated act is an act of generating a depth map by performing stereo matching on a downsampled stereo pair of images (act 608). In some instances, act 608 is performed utilizing one or more processors of a computer system (e.g., processor(s) 1205 of computer system 1200 shown in FIG. 12). As noted above, in some instances, performing stereo matching on a downsampled stereo pair of images (e.g., a downsampled stereo pair of images with a lowest pixel resolution or image size) involves identifying disparity values for corresponding pixels of the different images of the downsampled stereo pair of images that commonly represent an object captured by both images (e.g., within an overlapping region).

In some implementations, act 608 provides multiple depth maps, such as a depth map in the geometry of one downsampled image of the downsampled stereo pair of images and another depth map in the geometry of the other downsampled image of the downsampled stereo pair of images (e.g., left depth map 535A and left depth map 540A, see FIG. 5B). In other implementations, act 608 provides a single depth map in the geometry of either of the images of the downsampled stereo pair of images, or in some other geometry.

The fifth illustrated act is an act of generating an upsampled depth map based on the previously generated depth map (act 610). In some instances, act 610 is performed utilizing one or more processors of a computer system (e.g., processor(s) 1205 of computer system 1200 shown in FIG. 12). In some embodiments, generating an upsampled depth map involves performing upsampling functions and filtering functions on a previously generated depth map (e.g., a depth map generated by stereo matching according to act 608, or a most recently generated upsampled depth map according to an iterative performance of acts 610 and 612). In some instances, the upsampling function(s) is(are) performed prior to the filtering function(s), and in other instances, the upsampling function(s) and the filtering function(s) is(are) performed as a single operation (see FIGS. 5D and 5E).

In some instances, the filtering operations/functions implement an edge-preserving filter that uses guidance image data, such as image data from one or more images of a downsampled stereo pair of images or of an originally captured stereo pair of images. For example, the guidance data may be obtained from a (downsampled) stereo pair of images with an image size or pixel resolution that is greater than that of the previously generated depth map upon which the upsampling functions/operations are performed.

In some instances, the upsampling and filtering functions provide an upsampled depth map that corresponds in image size to a stereo pair of images (e.g., a downsampled stereo pair of images or an originally captured stereo pair of images). The filtering functions may comprise various forms, such as a joint bilateral filter, a guided filter, a bilateral solver, or any edge-preserving filtering technique that uses guidance image data.

The sixth illustrated act is an act of estimating sub-pixel disparity values for the upsampled depth map (act 612). In some instances, act 612 is performed utilizing one or more processors of a computer system (e.g., processor(s) 1205 of computer system 1200 shown in FIG. 12). In some embodiments, estimating sub-pixel disparity values may utilize various techniques, such as, for example, area-based matching, similarity interpolation, intensity interpolation, gradient-based methods, phase correlation, geometric methods, and/or others.

The dashed arrow 612A indicates that acts 610 and 612 are, in some instances, performed iteratively. In some instances, after performing upsampling and filtering operations and sub-pixel estimation to generate an upsampled depth map, a system (e.g., computer system 1200) performs upsampling and filtering operations and sub-pixel estimation on the upsampled depth map to generate yet another upsampled depth map with a higher pixel resolution (see FIG. 5G).

The seventh illustrated act is an act of removing rectification from a final upsampled depth map (act 614). In some instances, act 614 is performed utilizing one or more processors of a computer system (e.g., processor(s) 1205 of computer system 1200 shown in FIG. 12). The final upsampled depth map, in some instances, is an upsampled depth map generated according to acts 610 and 612 (whether performed iteratively or not) that has a desired pixel resolution (e.g., a highest pixel resolution). After removing rectification, in some implementations, the depth map (or depth maps) are usable for applications that depend on depth information, such as, for example, parallax error correction for providing pass-through views of an environment, hand or object tracking, building/updating a surface reconstruction mesh, streaming stereoscopic video, etc.

Temporally Consistent Depth Map Generation

Figure 7A:
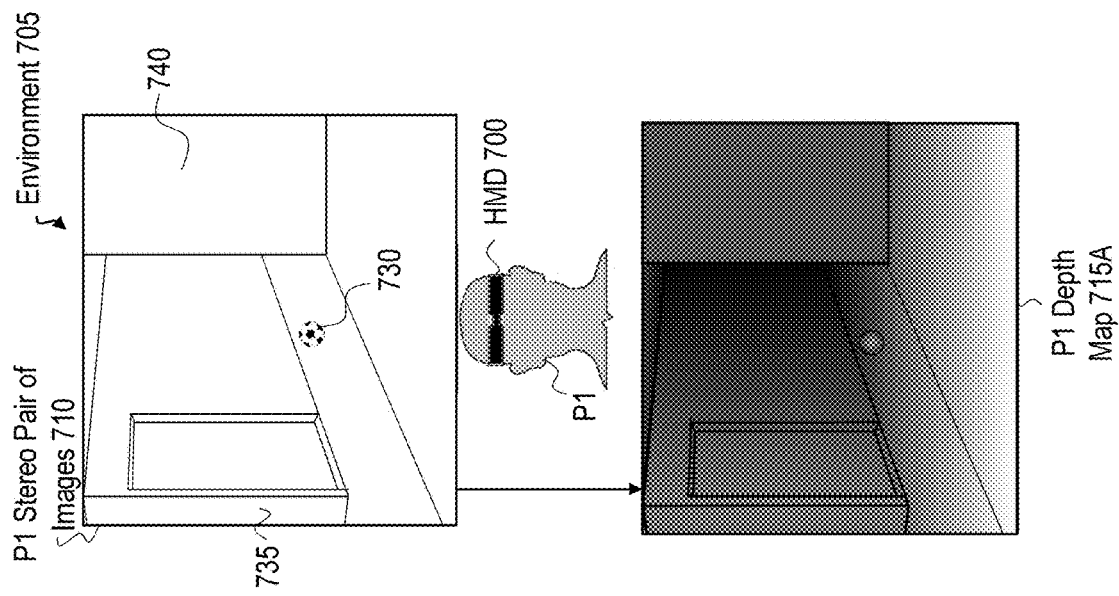
FIG. 7A illustrates capturing a stereo pair of images of an environment and generating a depth map of the environment.

Attention is now directed to FIG. 7A, which illustrates an HMD 700 capturing an environment 705 while the HMD 700 has a first pose P1 associated therewith. The HMD 700 is representative of the HMD 200 referred to in FIG. 2. As such, the HMD 700 utilizes scanning sensor(s) 205 to capture the environment 705. The instance depicted in FIG. 7A shows the HMD 700 utilizing stereo cameras (e.g., a left camera and a right camera) to capture a P1 stereo pair of images 710 of the environment 705 from the perspective of the stereo cameras of the HMD 700 while the HMD 700 has the first pose P1. FIG. 7A depicts the overlap region in which multiple images of the P1 stereo pair of images 710 each include corresponding pixels that represent common portions and/or objects of the environment 705. For example, multiple images of the P1 stereo pair of images 710 include pixels that represent the ball 730 and the walls 735 and 740 positioned within the environment 705.

Furthermore, in some embodiments, the HMD 700 identifies the first pose P1 using one or more inertial tracking components, such as accelerometer(s) 255, gyroscope(s) 260, and compass(es) 265. In some instances, the inertial tracking components operate in concert with one or more scanning sensor(s) 205 (e.g., head tracking cameras) to estimate 6DOF pose of the HMD 700 (e.g., under visual-inertial SLAM).

FIG. 7A also shows that, in some instances, the HMD 700 (or another system) generates a P1 depth map 715A based on the P1 stereo pair of images. A depth map may be obtained by performing stereo matching. As noted above, in some instances, stereo matching involves identifying disparity values for corresponding pixels of different images of a rectified stereo pair of images that commonly represent an object captured by both images. Furthermore, those skilled in the art will appreciate, in view of the present disclosure, that the HMD 700 (or another system) may employ principles disclosed herein with reference to FIGS. 5A-6 to generate the P1 depth map 715A.

Figure 7B:
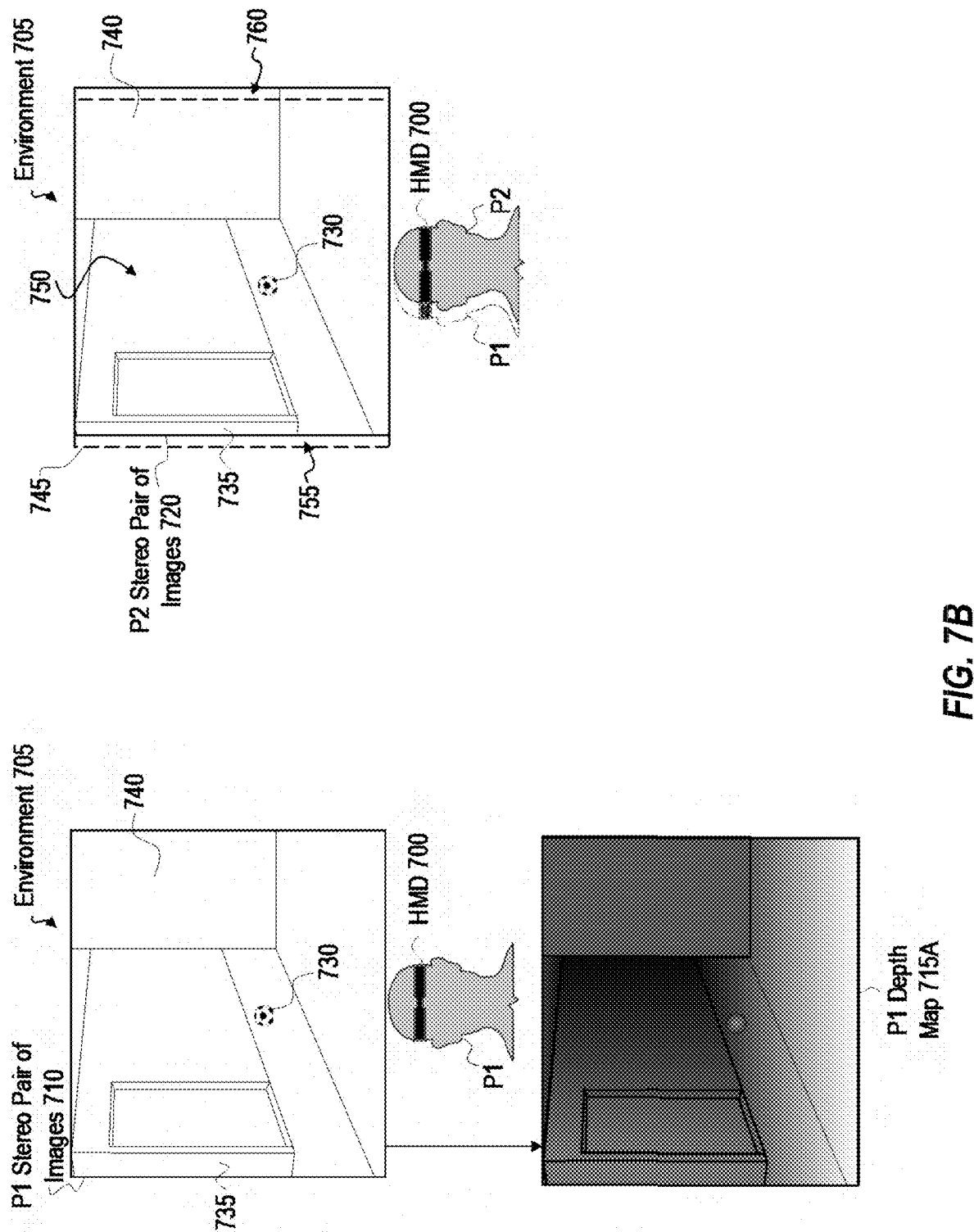
FIGS. 7B and 7C illustrate a conceptual representation of identifying an updated pose of a mixed-reality system and generating a reprojected depth map by performing a reprojection operation on the depth map based on the updated pose.

FIG. 7B illustrates a conceptual representation of identifying an updated pose P2 of the HMD 700 that is distinct from the first post P1. In some instances, the updated pose P2 is the pose of the HMD 700 at a timepoint that is subsequent to the timepoint associated with the first pose P1 of the HMD 700. In some implementations, the HMD 700 identifies the updated pose P2 based on updated inertial tracking data fused with updated head tracking camera data obtained by various components of the HMD 700.

As a user changes their position within an environment 705 over time, the stereo cameras of the HMD 700 capture different perspectives and/or portions of the environment 705. For example, FIG. 7B illustrates a P2 stereo pair of images 720 of the environment 705 captured by the stereo cameras of the HMD 700 while the HMD 700 has the updated pose P2. The dashed box 745 depicts the portion of the environment 705 captured by the P1 stereo pair of images 710 for comparison with the P2 stereo pair of images 720. FIG. 7B shows that the P2 stereo pair of images 720 captures significant portions of the environment 705 that were also captured in the P1 stereo pair of images 710, illustrated by region 750.

However, FIG. 7B shows that the P2 stereo pair of images 720 omits certain portions of the environment 705 that were captured in the P1 stereo pair of images 710, illustrated by region 755. For example, the P2 stereo pair of images fails to include a part of the wall 735 that was represented in the P1 stereo pair of images (e.g., within region 755). Similarly, FIG. 7B shows that the P2 stereo pair of images 720 captures additional portions of the environment 705 that were not represented in the P1 stereo pair of images, illustrated by region 760. For example, the P2 stereo pair of images includes a part of the wall 740 that the P1 stereo pair of images failed to include (e.g., portions of the wall within region 760).

In some instances, because of the change in perspective and the inherent complexity of stereoscopic depth calculations (e.g., stereo matching), discrepancies exist between the depth information included in the P1 depth map 715A that was generated based on the P1 stereo pair of images 710 and the depth information that would be included in a P2 depth map generated based on the P2 stereo pair of images 720. In one example, the disparity values for the ball 730 shown in the P1 depth map 715A might be inconsistent with disparity values for the ball 730 that would be shown in a P2 depth map generated by performing stereo matching on the P2 stereo pair of images 720.

In some instances, depth inconsistencies for objects represented in consecutively generated depth maps (e.g., temporal inconsistencies) give rise to degraded user experiences. Continuing with the above example regarding the ball 730, temporal inconsistencies between the P1 depth map 715A and a P2 depth map may cause depth flickers in parallax-corrected pass-through views of the ball 730, which may render the frame-to-frame representations of the ball inaccurate and/or undesirable.

Accordingly, at least some disclosed embodiments are directed to providing temporal consistency between consecutively generated depth maps by utilizing depth information from a previous depth map while generating a subsequent depth map.

Figure 7C:
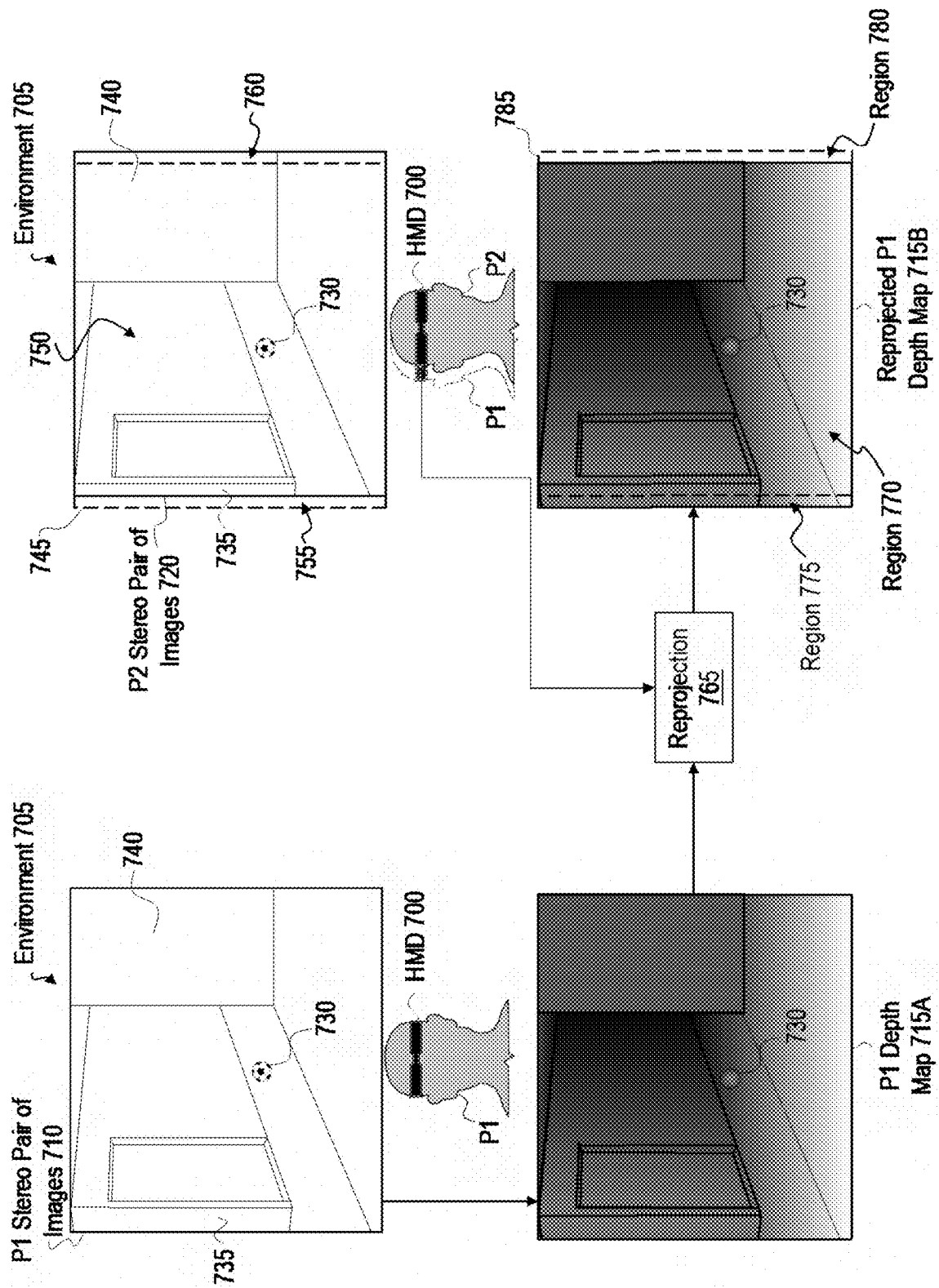

Pursuant to providing temporally consistent consecutively generated depth maps, FIG. 7C illustrates generating a reprojected P1 depth map 715B by performing a reprojection operation 765 on the P1 depth map 715A. In some implementations, the HMD 700 (or another system) performs the reprojection operation 765 utilizing pose data for the updated pose P2 obtained by the HMD 700 (or another system). The HMD 700 (or another system) then reprojects the P1 depth map 715A to correspond to the perspective of the environment associated with the updated pose P2, providing the reprojected P1 depth map 715B.

Put differently, the HMD 700 (or another system) generates the reprojected P1 depth map 715B by using the updated pose P2 to reproject the P1 depth map 715A to align the P1 depth map 715A with the P2 stereo pair of images 720. For example, in some instances, the HMD 700 identifies depth points (e.g., a point cloud or other three-dimensional reconstruction) in three-dimensional space based on the disparity values represented in the P1 depth map 715A by projecting the disparity values into three-dimensional space. The system may then reproject or transform the depth points, using the pose data for the updated pose P2, to align the P1 depth map 715A with the perspective from which the P2 stereo pair of images 720 is captured.

For example, the dashed box 785 of FIG. 7C depicts the perspective from which the P2 stereo pair of images 720 is captured for comparison with the reprojected P1 depth map 715B. As shown in FIG. 7C, the depth information for the objects represented in the reprojected P1 depth map 715B are aligned with same objects as represented in the P2 stereo pair of images 720, illustrated by region 770. For example, the spatial coordinates of the depth values representing the ball 730 in the reprojected P1 depth map 715B are aligned with the spatial coordinates of the pixels representing the ball 730 in the P2 stereo pair of images 720.

It should be noted that, in some instances, the updated pose P2 is a predicted pose associated with the HMD 700. Accordingly, in some instances, the reprojection operation 765 aligns the P1 depth map with a perspective that is predicted will exist for the HMD 700 when the HMD 700 captures the P2 stereo pair of images.

Furthermore, FIG. 7C illustrates that, in some instances, the reprojected P1 depth map 715B includes depth information for portions of the environment 705 that are not represented in the P2 stereo pair of images, illustrated by region 775. In one example, the reprojected P1 depth map includes depth information for portions of the wall 735 that are not shown in the P2 stereo pair of images 720. The extraneous depth information in region 775 is, in some instances, omitted from further processing to save computational resources.

In addition, FIG. 7C illustrates that, in some instances, the reprojected P1 depth map 715B fails to include depth information for portions of the environment 705 that are represented in the P2 stereo pair of images, illustrated by region 780. In one example, the reprojected P1 depth map fails to include depth information for portions of the wall 740 that are shown in the P2 stereo pair of images 720 (e.g., the portions of the wall corresponding to region 780, but not shown in region 780, for example).

In some embodiments, the reprojected P1 depth map is used while generating a P2 depth map by performing stereo matching on the P2 stereo pair of images 720 to provide temporal consistency between the P1 depth map and the P2 depth map.

Figure 8:
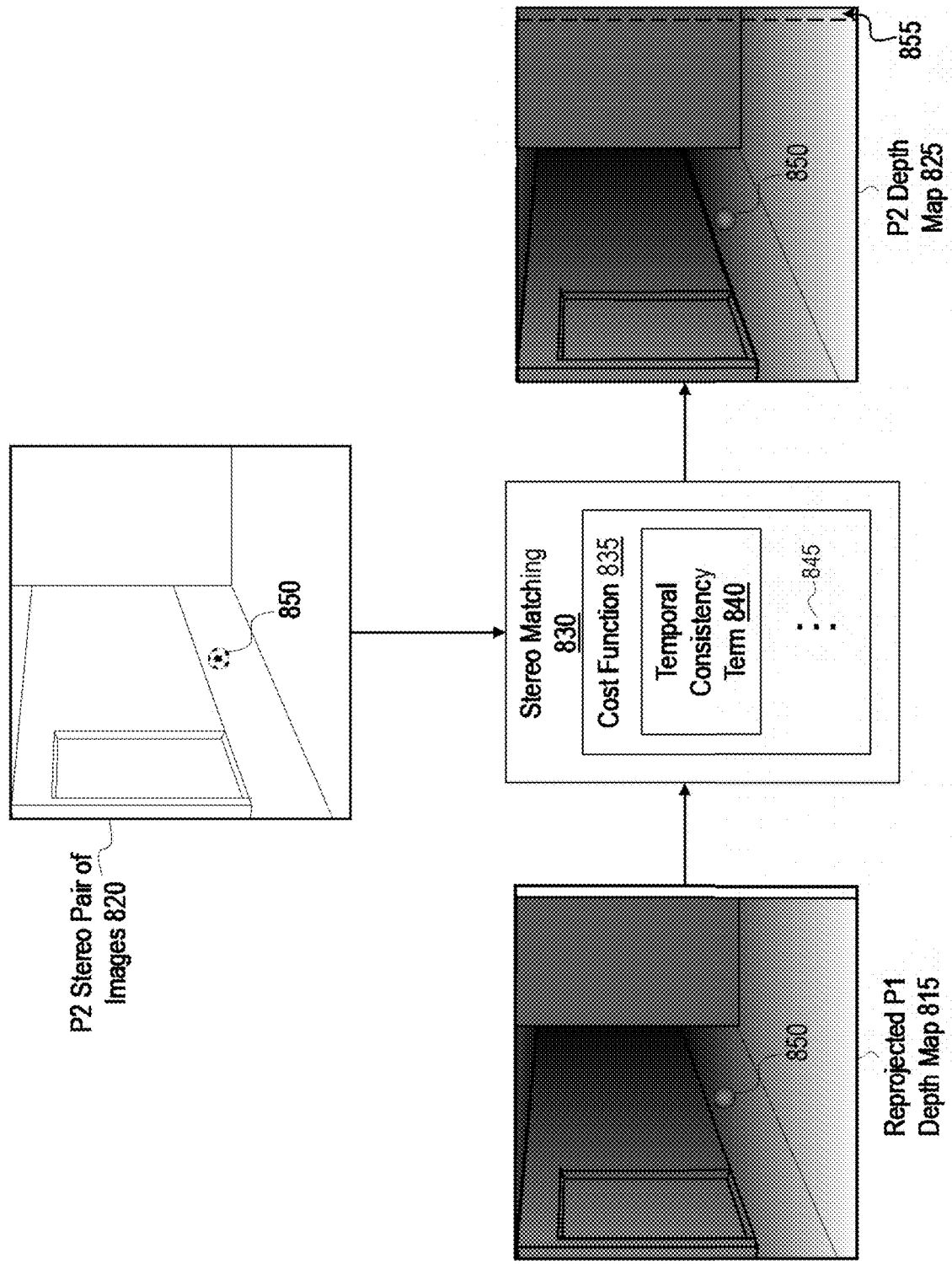
FIG. 8 illustrates a conceptual representation of generating a depth map that corresponds with an updated pose by performing stereo matching using a reprojected depth map.

Attention is now directed to FIG. 8, which illustrates a conceptual representation of generating a depth map that corresponds with an updated pose by performing stereo matching using a reprojected depth map. In particular, FIG. 8 shows the reprojected P1 depth map 815, which is representative of the reprojected P1 depth map 715A shown and described with reference to FIG. 7C. Furthermore, FIG. 8 shows the P2 stereo pair of images 820, which is representative of the P2 stereo pair of images 720 shown and described with reference to FIG. 7C. As discussed above, the reprojected P1 depth map 815 is reprojected based on the updated pose P2, which is the pose associated with the perspective from which the P2 stereo pair of images 820 is captured.

FIG. 8 also illustrates a stereo matching operation 830, which generates the P2 depth map 825 by operating on the P2 stereo pair of images 820 (e.g., after rectification) and using the reprojected P1 depth map. In some instances, as illustrated in FIG. 8, the stereo matching operation generates depth maps by using a cost function 835 (or other similarity measure) to determine the cost at every pixel location for relevant disparities. For every pixel location, the stereo matching operation 830 selects the disparity value that has the overall minimum cost.

In some instances, a cost function 835 of a stereo matching operation 830 implements various terms and/or optimizations to determine the cost at every pixel location, such as a data term, a smoothness term, a semi-global accumulation scheme, a continuity term, consistency checks, coarse-to-fine, and/or others, indicated in FIG. 8 by the ellipsis 845.

The cost function 835 of stereo matching operation 830 implements a temporal consistency term 840. In some implementations, the temporal consistency term 840 of the cost function 835 applies a cost bonus (e.g., a cost reduction) for pixels (or pixel locations) of the P2 depth map 825 that share a same or similar disparity value with corresponding pixels (or pixel locations) of the reprojected P1 depth map 815.

To assist in understanding, the reprojected P1 depth map 815 may be thought of as a set of predicted disparity values for the P2 depth map 825. The temporal consistency term 840 will, in some instances, cause the pixels of the P2 depth map 825 to have a minimum cost by adopting the predicted disparity value (or a disparity value that is similar to the predicted disparity value). This may occur, for example, in situations where the disparity value for a pixel, as determined based on pixel (or patch) matching between the P2 stereo pair of images 820, is close to but different than the predicted disparity value based on the reprojected P1 depth map 815.

By way of illustrative example, consider the ball 850 represented in the reprojected P1 depth map 815. The disparity values for the ball 850 in the reprojected P1 depth map 815 may be thought of as predicted disparity values for the pixels in the P2 depth map 825 that will describe the ball 850 as captured in the P2 stereo pair of images 820. While performing stereo matching operation 830 to calculate the disparity values for the ball 850 in the P2 depth map, the cost function 835 may determine the cost associated with disparity values for the pixels that describe the ball 850 based on pixel (or patch) matching between the P2 stereo pair of images 820. The disparity values based on pixel (or patch) matching between the P2 stereo pair of images 820 may be near the predicted disparity values based on the reprojected P1 depth map 815 but may still be inconsistent with the predicted disparity values. Adopting the inconsistent disparity values may degrade user experiences that depend on consecutive depth computations, such as providing continuous parallax-corrected pass-through views of a user's environment (e.g., depth flickers may be evident to the user).

Thus, the cost function 835 of the stereo matching operation 830 includes the temporal consistency term 840 that provides a cost bonus (e.g., cost reduction) for pixels that share a same or similar disparity value with the predicted disparity values of corresponding pixels of the reprojected P1 depth map 815. Continuing with the above example, the cost function 835 may determine that the cost associated with disparity values for pixels that describe the ball 850 is lower than the cost for disparity values based on pixel matching when the pixels that describe the ball 850 adopt the predicted disparity values of corresponding pixels of the reprojected P1 depth map 815 (e.g., because of the cost bonus associated with the temporal consistency term 840). In some instances, by adopting disparity values in the P2 depth map 825 for the ball 850 that are consistent with the previously computed reprojected P1 depth map 815, depth flickers and/or other artifacts may be avoided in user experiences that depend on consecutive depth map computation, such as providing continuous parallax-corrected pass-through views of a user's environment.

However, in some instances, adopting the predicted disparity value would contravene a strong signal in the P2 stereo pair of images 820 that indicates a disparity value that is more accurate (e.g., provides a lower cost) than adopting the predicted disparity value (even after considering the cost bonus of the temporal consistency term 840). For example, in some situations, the cost bonus of the temporal consistency term 840 fails to provide a lower cost for a pixel than a disparity value based on pixel (or patch) matching between the P2 stereo pair of images 820. In such situations, the stereo matching operation 830 ignores the predicted disparity for that pixel and selects the disparity value based on pixel (or patch) matching. This may occur, for example, in situations where there is motion in the captured scene).

In one illustrative example, if the ball 850 were in motion and therefore in a different position in the P2 stereo pair of images 820 relative to the position of the ball 850 captured in the reprojected P2 depth map 815, the disparity values for the ball 850 may have a lowest cost when based on pixel matching rather than when based on the predicted disparity values from the reprojected P1 depth map 815. Accordingly, the disparity values for the ball 850 based on pixel matching, rather than the predicted disparity values, may be represented in the P2 depth map 825.

FIG. 8 illustrates that, in some instances, the reprojected P1 depth map 815 fails to include predicted disparity values for every portion of the environment represented in the P2 stereo pair of images 820. However, the stereo matching operation 830 may obtain disparity values for such portions based on pixel (or patch) matching. For example, the P2 depth map 825 includes region 855, which represents a portion of the environment for which the reprojected P1 depth map 815 includes no disparity values. In some instances, the disparity values of the P2 depth map 825 are identified and represented in the depth map (e.g., P2 depth map 825) based on pixel/patch matching between the P2 stereo pair of images 820.

Those skilled in the art will recognize, in view of the present disclosure, that the principles disclosed herein related to temporally consistent depth map generation may be selectively applied in various circumstances. For example, in some instances a system (e.g., HMD 200) captures an initial high-resolution stereo pair of images at an initial pose and performs stereo matching thereon to obtain an initial depth map. The system then captures a subsequent high-resolution stereo pair of images at an updated pose and generates an updated depth map based on the subsequent high-resolution stereo pair of images while using a reprojected initial high-resolution stereo pair of images that was reprojected based on the updated pose (e.g., using stereo matching operation 830, as described herein).

In other instances, the system captures a first stereo pair of images and downsamples the first stereo pair of images and generates a depth map based on the downsampled first stereo pair of images. The system then captures a second stereo pair of images at a second pose and downsamples the second stereo pair of images. The system then generates a second depth map based on the downsampled second stereo pair of images while using a reprojected downsampled first stereo pair of images that was reprojected based on the second pose.

Furthermore, FIG. 9 illustrates a conceptual representation of generating upsampled depth maps by performing upsampling and filtering operations that use reprojected depth maps. Specifically, FIG. 9 shows the P2 stereo pair of images 920A, which is representative of the P2 stereo pairs of images 720 and 820 from FIGS. 7B-8. FIG. 9 also illustrates a reprojected P1 depth map 915A.

In addition, FIG. 9 illustrates a plurality of P2 stereo pairs of images and a plurality of reprojected P1 depth maps. For example, FIG. 9 shows iterative downsampling operations 935A-935C. As shown in FIG. 9, the iterative downsampling operations 935A-935C provide downsampled P2 stereo pairs of images 920B-920D of decreasing size, with downsampled P2 stereo pair of images 920D having a smallest image resolution. Similarly, FIG. 9 illustrates iterative downsampling operations 940A-940C, which provide downsampled reprojected P1 depth maps 915B-915D of decreasing size, with downsampled reprojected P1 depth map 915D having a smallest image resolution. In some instances, the downsampling operations 935A-935C and 940A-940C are similar to the downsampling operations 525A-525C and/or 530A-530C described hereinabove with reference to FIG. 5A. Furthermore, in some instances, the reprojected P1 depth map 915D is representative of the reprojected P1 depth map 815 from FIG. 8.

In some implementations, no downsampling steps are performed to generate the downsampled reprojected depth maps 915B-915D. For example, in some implementations, P1 depth maps (which are not reprojected) of image resolutions that correspond to the reprojected P1 depth map 915A and/or the downsampled reprojected P1 depth maps 915B-D exist in memory from previously performing upsampling and filtering operations (e.g., similar to upsampling and filtering operations described hereinbelow) on a P1 depth map that was generated by performing stereo matching on a downsampled stereo pair of images (e.g., a downsampled P1 stereo pair of images, not shown). In such instances, the various P1 depth maps that exist in memory are reprojected according to an updated pose (e.g., an updated pose P2) to provide the reprojected P1 depth map 915A and the downsampled reprojected P1 depth maps 915B-915D (without performing downsampling operations).

FIG. 9 also illustrates stereo matching operation 930, which is representative of stereo matching operation 830 shown and described with reference to FIG. 8. For example, in some instances, the stereo matching operation 930 includes a temporal consistency term 840 to provide temporal consistency between consecutively generated depth maps.

As shown in FIG. 9, the stereo matching operation 930 generates P2 depth map 925A by operating on the downsampled P2 stereo pair of images 920D while using the downsampled reprojected P1 depth map 915D. For example, in some instances, the downsampled reprojected P1 depth map 915D provides predicted disparity values that may be adopted by pixels of the P2 depth map 925A to provide temporal consistency between the P2 depth map 925A and a previously computed depth map. By generating the P2 depth map 925A by performing the stereo matching operation 930 using a downsampled P2 stereo pair of images 920D and a downsampled reprojected P1 depth map 915D (e.g., a P2 stereo pair of images and a reprojected P1 depth map with a lowest image size), a system (e.g., HMD 200) may save on computational resources, as described hereinabove.

FIG. 9 also illustrates generating an upsampled P2 depth map 925B. For example, FIG. 9 shows generating an upsampled P2 depth map 925B by performing an upsampling and filtering operation 945A on P2 depth map 925A. The upsampling and filtering operation 945A causes the upsampled P2 depth map 925B to have a higher image resolution than the P2 depth map 925A. In some instances, the upsampling and filtering operation 945A is similar, in many respects, to the upsampling and filtering operations 565A-565B and 570-570C shown and described hereinabove with reference to FIGS. 5F and 5G. For example, the upsampling and filtering operation 945A may comprise an edge-preserving filter that uses guidance image data, such as a joint bilateral filter, a guided filter, a bilateral solver, and/or others. As shown in FIG. 9, the upsampling and filtering operation 945A obtains guidance data 950A from downsampled P2 stereo pair of images 920C to perform edge-preserving filtering with guidance image data for the upsampled P2 depth map 925B.

As depicted in FIG. 9, the upsampling and filtering operation 945A adds a temporal dimension to the two spatial dimensions of the edge-preserving filter thereof, making the edge-preserving filter of the upsampling and filtering operation 945A a three-dimensional edge-preserving filter. For example, FIG. 9 illustrates that the upsampling and filtering operation 945A additionally uses averaging data 955A from the downsampled reprojected P1 depth map 915C to generate the upsampled P2 depth map 925B. In some instances, the addition of the averaging data 955A enables the upsampling and filtering operation 945A to generate each pixel of the upsampled P2 depth map 925B based on a weighted average of neighboring pixels of both the downsampled P2 stereo pair of images 920C and the downsampled reprojected P2 depth map 915C within a three-dimensional window. In some instances, this approach provides additional smoothing, improves the temporal consistency between the P2 depth map 925A and a previously computed depth map (e.g., a P1 depth map that is not reprojected, not shown), and/or improves the precision of depth borders represented within the upsampled P2 depth map 925B.

Furthermore, FIG. 9 illustrates a sub-pixel estimation operation 960A applied to the upsampled P2 depth map 925B. In some instances, the sub-pixel estimation operation 960A is similar to the sub-pixel estimation operations 585A and 590A shown and described hereinabove with reference to FIGS. 5F and 5G.

In addition, FIG. 9 shows that, in some implementations, upsampling and filtering operations are performed iteratively to generate upsampled depth maps with a desired level of image resolution. For example, FIG. 9 depicts upsampling and filtering operation 945B applied to upsampled P2 depth map 925B, producing upsampled P2 depth map 925C with higher pixel resolution than upsampled P2 depth map 925B. In some instances, the upsampling and filtering operation 945B utilizes guidance data 950B from downsampled P2 stereo pair of images 920B and averaging data 955B from downsampled reprojected P1 depth map 915B for generating upsampled P2 depth map 925C. In some instances, upsampled P2 depth map 925C has an image resolution that corresponds to that of downsampled P2 stereo pair of images 920B. Furthermore, FIG. 9 shows sub-pixel estimation operation 960B applied to upsampled P2 depth map 925C.

FIG. 9 also depicts upsampling and filtering operation 945C applied to upsampled P2 depth map 925C using guidance data 950C from P2 stereo pair of images 920A (e.g., an originally captured stereo pair of images) and averaging data 955C from reprojected P1 depth map 915A, producing upsampled P2 depth map 925D. FIG. 9 also illustrates sub-pixel estimation operation 960C applied to upsampled P2 depth map 925D.

In this regard, in some embodiments, a system (e.g., HMD 200) utilizes iterative upsampling and filtering operations (e.g., upsampling and filtering operations 945A-945C) to generate one or more upsampled depth maps (e.g., upsampled P2 depth map 925D) that have an image resolution that corresponds to the image resolution of the originally captured stereo pair of images (e.g., P2 stereo pair of images 920A).

Those skilled in the art will recognize, in view of the present disclosure, that any number of upsampling and filtering operations may be performed, and the upsampled P2 depth map with a highest image resolution need not have an image resolution that corresponds to that of the P2 stereo pair of images 920A.

Although FIG. 9 displays a particular number of downsampling and upsampling and filtering operations, those skilled in the art will recognize, in view of the present disclosure, that the number of downsampling and/or upsampling and filtering operations performed may vary in different implementations. Furthermore, although, for simplicity, FIG. 9 shows a single depth map (i.e., P2 depth map 925A)

resulting from the stereo matching operation 930, those skilled in the art will recognize, in view of the present disclosure, that a stereo matching operation 930 could provide multiple depth maps, such as a depth map that corresponds to the geometry of one image of the downsampled P2 stereo pair of images 920D and another depth map that corresponds to the geometry to another image of the downsampled P2 stereo pair of images 920D (see, for example, FIGS. 5B-5G and attendant description). Furthermore, those skilled in the art will recognize, in view of the present disclosure, that, in some instances, different depth maps generated by the stereo matching operation have different upsampling and filtering operations applied thereto that utilize different guidance and/or averaging data.

Example Method(s) for Temporally Consistent Depth Map Generation

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
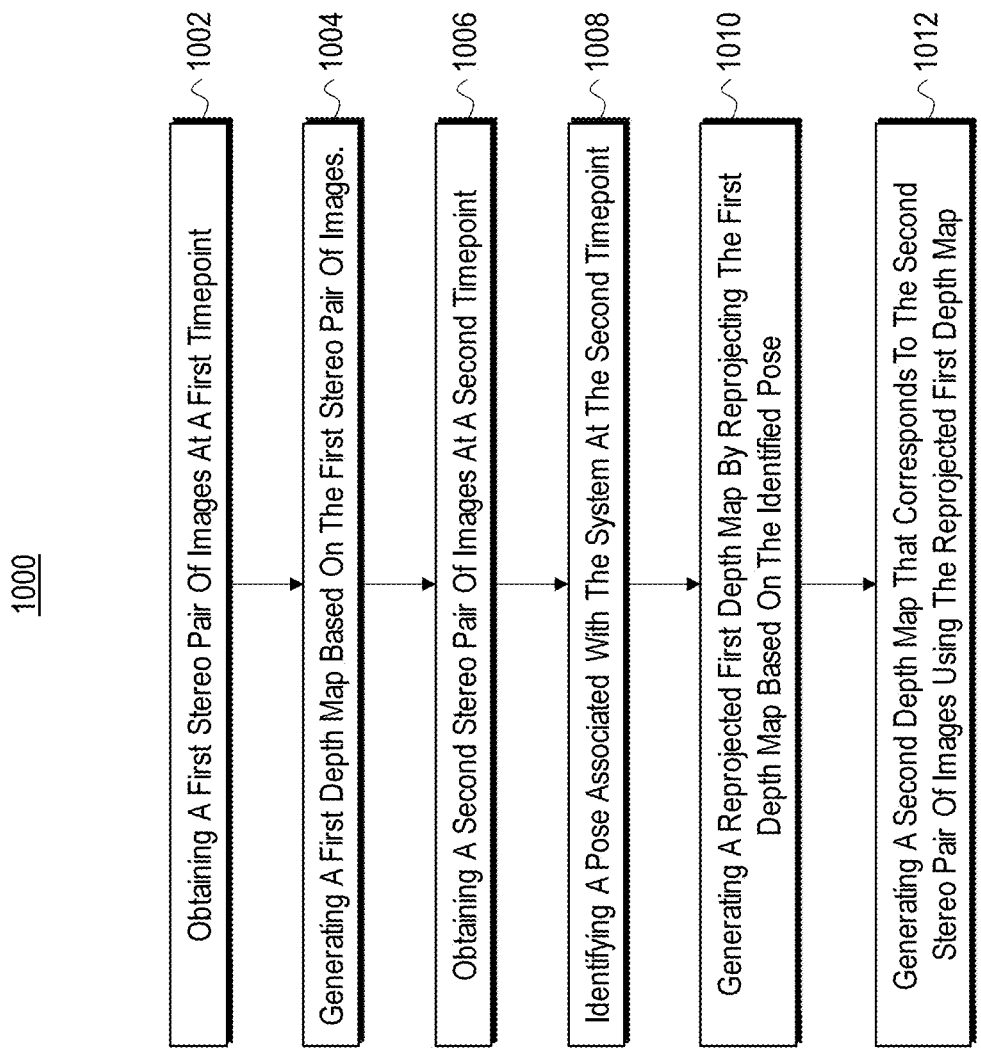
FIGS. 10 and 11 illustrate example flow diagrams depicting methods for generating temporally consistent depth maps.

FIG. 10 illustrates an example flow diagram 1000 that depicts various acts associated with methods for generating temporally consistent depth maps. The discussion of the various acts represented in flow diagram 1000 includes references to various hardware components described in more detail with reference to FIGS. 2 and 12.

The first illustrated act is an act of obtaining a first stereo pair of images at a first timepoint (act 1002). Act 1002 is performed, in some instances, utilizing scanning sensor(s) 205 of an HMD 200 (see FIG. 2), such as a stereo camera pair comprising any combination of visible light camera(s) 210, low light camera(s) 215, thermal imaging camera(s) 220, UV camera(s) 225, and/or other cameras. In some instances, the stereo pair of images includes a left image and a right image that share an overlapping region in which both the left image and the right image capture common portions of an environment (e.g., P1 stereo pair of images 710 shown in FIG. 7A).

Furthermore, in some instances, the first stereo pair of images is a downsampled first stereo pair of images that is generated by applying downsampling operations on a stereo pair of images that was captured by a stereo camera pair (see FIG. 9).

The second illustrated act is an act of generating a first depth map based on the first stereo pair of images (act 1004). In some instances, act 1004 is performed utilizing one or more processors of a computer system (e.g., processor(s) 1205 of computer system 1200 shown in FIG. 12). In some instances, the first depth map is generated by performing stereo matching on the first stereo pair of images obtained according to act 1002. In some implementations, the first depth map is obtained using principles disclosed herein with reference to FIGS. 5A-6.

The third illustrated act is an act of obtaining a second stereo pair of images at a second timepoint (act 1006). Act 1006 is performed, in some instances, utilizing scanning sensor(s) 205 of an HMD 200 (see FIG. 2), such as a stereo camera pair. In some instances, the second stereo pair of images and the first stereo pair of images (obtained according to act 1002) are obtained by the same stereo camera pair.

Furthermore, in some instances, the second stereo pair of images is a downsampled second stereo pair of images that is generated by applying downsampling operations on a stereo pair of images that was captured by a stereo camera pair (see FIG. 9).

The fourth illustrated act is an act of identifying a pose associated with the system at the second timepoint (act 1008). Act 1008 is performed, in some instances, using one or more inertial tracking components of a system (e.g., HMD 200), such as accelerometer(s) 255, gyroscope(s) 260, and compass(es) 265. In some instances, the inertial tracking components operate in concert with one or more scanning sensor(s) 205 (e.g., head tracking cameras) to estimate 6DOF pose of the system (e.g., under visual-inertial SLAM). In some instances, the pose associated with the system at the second timepoint is different than a pose associated with the system at the first timepoint.

The fifth illustrated act is an act of generating a reprojected first depth map by reprojecting the first depth map based on the identified pose (act 1010). In some instances, act 1010 is performed utilizing one or more processors of a computer system (e.g., processor(s) 1205 of computer system 1200 shown in FIG. 12). In some implementations, the reprojected first depth map is generated by performing a reprojection operation (e.g., reprojection operation 765 from FIG. 7C) that aligns the first depth map with the second stereo pair of images, such that objects represented in both the first depth map and the second stereo pair of images are aligned.

The sixth illustrated act is an act of generating a second depth map that corresponds to the second stereo pair of images using the reprojected first depth map (act 1012). In some instances, act 1012 is performed utilizing one or more processors of a computer system (e.g., processor(s) 1205 of computer system 1200 shown in FIG. 12). In some embodiments, generating the second depth map involves implementing a temporal consistency term (e.g., temporal consistency term 840 of FIG. 8) into a cost function (e.g., cost function 835 of FIG. 8) for performing stereo matching on the second stereo pair of images. The temporal consistency term, in some implementations, applies a cost bonus for pixels of the second depth map that share a same or similar disparity value with corresponding pixels of the reprojected first depth map.

Figure 11:
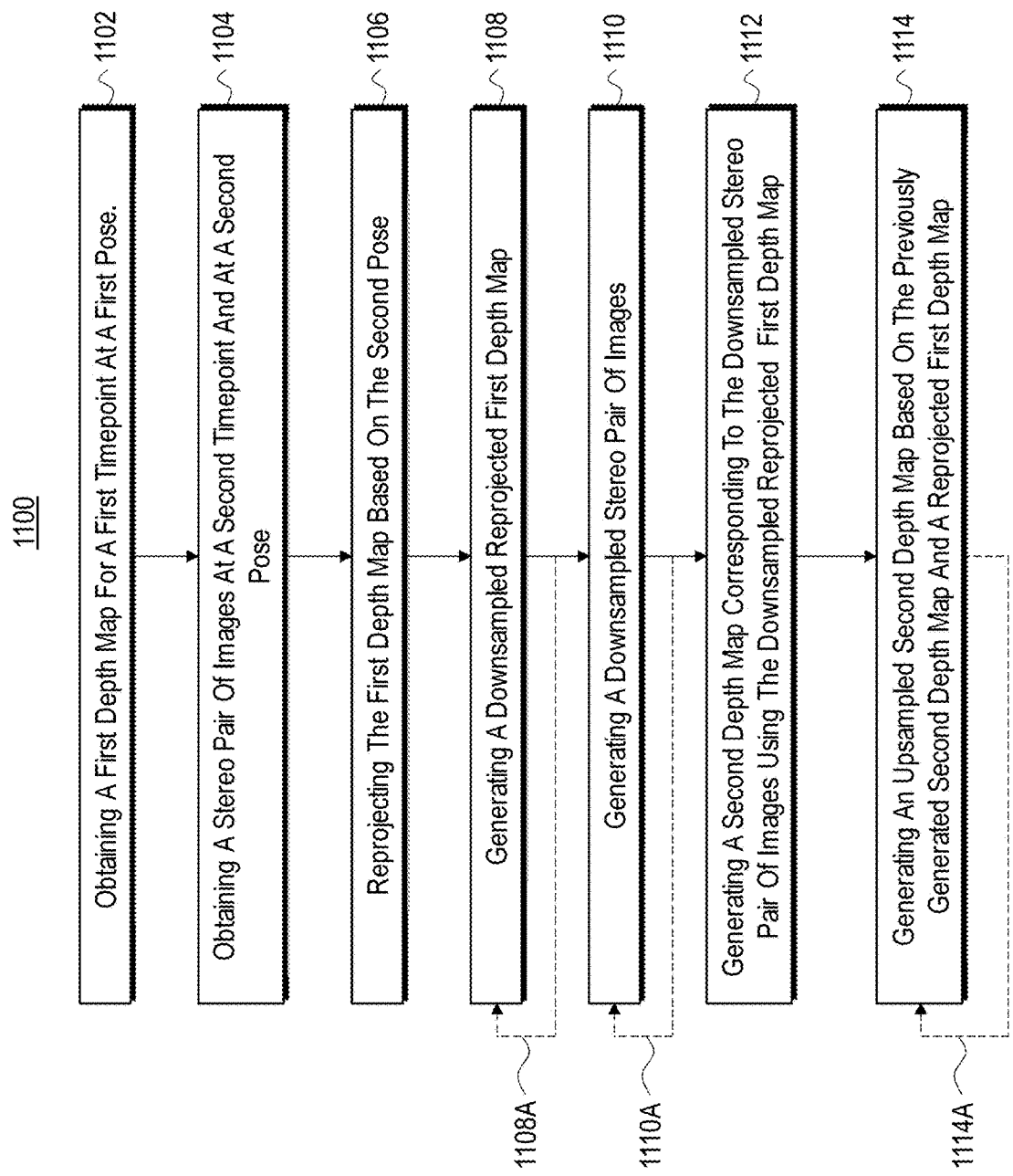

FIG. 11 illustrates an example flow diagram 1100 that depicts various acts associated with methods for generating temporally consistent depth maps. The discussion of the various acts represented in flow diagram 1100 includes references to various hardware components described in more detail with reference to FIGS. 2 and 12.

The first illustrated act is an act of obtaining a first depth map for a first timepoint at a first pose (act 1102). In some instances, act 1102 is performed utilizing one or more processors of a computer system (e.g., processor(s) 1205 of computer system 1200 shown in FIG. 12). In some instances, the first depth map is generated by performing stereo matching on a first stereo pair of images obtained at the first timepoint and at the first pose. In some implementations, the first depth map is obtained using principles disclosed herein with reference to FIGS. 5A-6 and/or FIG. 9.

The second illustrated act is an act of obtaining a stereo pair of images at a second timepoint and at a second pose (act 1104). Act 1104 is performed, in some instances, utilizing scanning sensor(s) 205 of an HMD 200 (see FIG. 2) to capture the stereo pair of images, such as a stereo camera pair and/or head tracking cameras, and one or more inertial tracking components to identify the second pose, such as accelerometer(s) 255, gyroscope(s) 260, and compass(es) 265. In some instances, the stereo pair of images and the first stereo pair of images used to obtain the first depth map are obtained by the same stereo camera pair.

The third illustrated act is an act of reprojecting the first depth map based on the second pose (act 1106). In some instances, act 1106 is performed utilizing one or more processors of a computer system (e.g., processor(s) 1205 of computer system 1200 shown in FIG. 12). In some implementations, act 1106 includes performing a reprojection operation (e.g., reprojection operation 765 from FIG. 7C) based on the second pose that aligns the first depth map with the second stereo pair of images, such that objects represented in both the first depth map and the second stereo pair of images are aligned.

The fourth illustrated act is an act of generating a downsampled reprojected first depth map (act 1108). In some instances, act 1108 is performed utilizing one or more processors of a computer system (e.g., processor(s) 1205 of computer system 1200 shown in FIG. 12). In some embodiments, generating a downsampled reprojected first depth map comprises performing downsampling operations on a reprojected first depth map to provide a downsampled reprojected first depth map with a reduced image size (e.g., pixel resolution) compared to that of the original reprojected first depth map (e.g., such as a reduction by a factor of at least 2). Downsampling operations can include various techniques, such as applying an averaging filter.

The dashed arrow 1108A indicates that act 1108 is, in some instances, performed iteratively. In some instances, after performing downsampling operations on a reprojected first depth map to generate a downsampled reprojected first depth map, a system (e.g., computer system 1200) performs downsampling operations on the downsampled reprojected first depth map to generate yet another downsampled reprojected first depth map with an even lower pixel resolution (see FIG. 9). In some implementations, iteratively performing act 1108 generates a plurality of reprojected first depth maps with different image resolutions, with at least one downsampled reprojected first depth map having a lowest image resolution.

The fifth illustrated act is an act of generating a downsampled stereo pair of images (act 1110). In some instances, act 1110 is performed utilizing one or more processors of a computer system (e.g., processor(s) 1205 of computer system 1200 shown in FIG. 12). In some embodiments, generating a downsampled stereo pair of images comprises performing downsampling operations on a stereo pair of images to provide a downsampled stereo pair of images with a reduced image size (e.g., pixel resolution) compared to that of the original stereo pair of images (e.g., such as a reduction by a factor of at least 2). Downsampling operations can include various techniques, such as applying an averaging filter.

The dashed arrow 1110A indicates that act 1110 is, in some instances, performed iteratively. In some instances, after performing downsampling operations on a captured stereo pair of images to generate a downsampled stereo pair of images, a system (e.g., computer system 1200) performs downsampling operations on the downsampled stereo pair of images to generate yet another downsampled stereo pair of images with an even lower pixel resolution (see FIG. 9). In some implementations, iteratively performing act 1110 generates a plurality of stereo pairs of images with different image resolutions, with at least one downsampled stereo pair of images having a lowest image resolution.

The sixth illustrated act is an act of generating a second depth map corresponding to the downsampled stereo pair of images using the downsampled reprojected first depth map (act 1112). In some instances, act 1112 is performed utilizing one or more processors of a computer system (e.g., processor(s) 1205 of computer system 1200 shown in FIG. 12). In some embodiments, generating the second depth map involves implementing a temporal consistency term (e.g., temporal consistency term 840 of FIG. 8) into a cost function (e.g., cost function 835 of FIG. 8) for performing stereo matching on the downsampled stereo pair of images that has the lowest image resolution. The temporal consistency term, in some implementations, applies a cost bonus for pixels of the second depth map that share a same or similar disparity value with corresponding pixels of the reprojected first depth map.

The seventh illustrated act is an act of generating an upsampled second depth map based on the previously generated second depth map and a reprojected first depth map (act 1114). In some instances, act 1114 is performed utilizing one or more processors of a computer system (e.g., processor(s) 1205 of computer system 1200 shown in FIG. 12). In some embodiments, generating an upsampled second depth map involves performing upsampling functions and filtering functions on a previously generated second depth map (e.g., a second depth map generated by stereo matching according to act 1112, or a most recently generated upsampled depth map according to an iterative performance of act 1114). In some instances, the upsampling function(s) is(are) performed prior to the filtering function(s), and in other instances, the upsampling function(s) and the filtering function(s) is(are) performed as a single operation.

In some instances, the filtering operations/functions implement an edge-preserving filter that uses guidance image data, such as image data from one or more images of a downsampled stereo pair of images or of an originally captured stereo pair of images. Furthermore, in some instances, the edge-preserving filter additionally uses averaging data, such as averaging data from one or more reprojected first depth maps or downsampled reprojected first depth maps. For example, the guidance data and/or averaging data may be obtained from a (downsampled) stereo pair of images and/or a (downsampled) reprojected first depth map with an image size or pixel resolution that is greater than that of the previously generated second depth map upon which the upsampling functions/operations are performed.

In some instances, the upsampling and filtering functions provide an upsampled second depth map that corresponds in image size to a stereo pair of images (e.g., a downsampled stereo pair of images or an originally captured stereo pair of images). The filtering functions may comprise various forms, such as a joint bilateral filter, a guided filter, a bilateral solver, or any edge-preserving filtering technique that uses guidance image data.

The dashed arrow 1114A indicates that act 1114 is, in some instances, performed iteratively. In some instances, after performing upsampling and filtering operations to generate an upsampled second depth map, a system (e.g., computer system 1200) performs upsampling and filtering operations on the upsampled second depth map to generate yet another upsampled second depth map with a higher pixel resolution (see FIG. 9).

Example Computer System(s)

Figure 12:
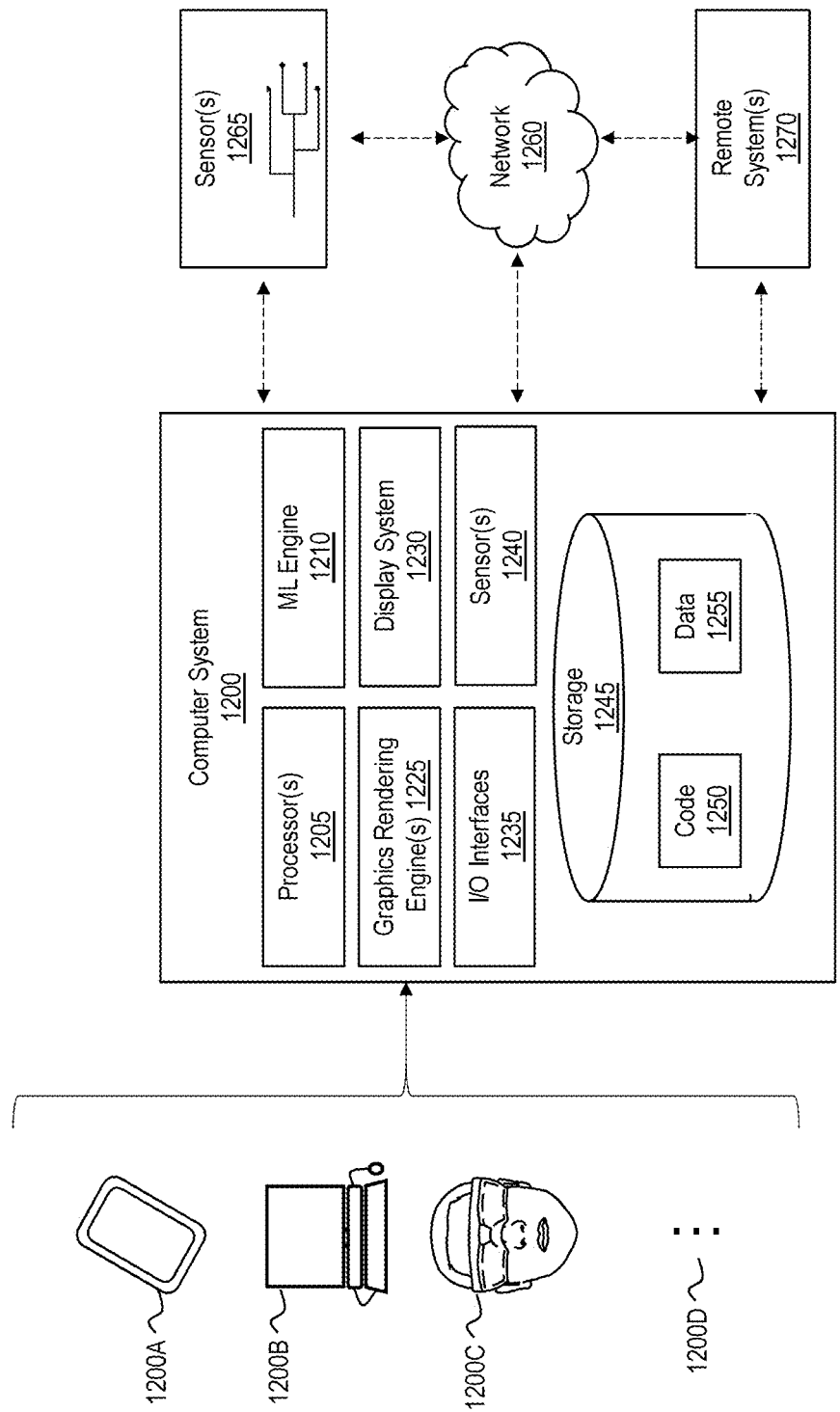
FIG. 12 illustrates an example computer system that may include and/or be used to implement disclosed embodiments.

Having just described the various features and functionalities of some of the disclosed embodiments, the focus will now be directed to FIG. 12 which illustrates an example computer system 1200 that may include and/or be used to facilitate the operations described herein. In particular, this computer system 1200 may be implemented as part of a mixed-reality HMD, as noted hereinabove.

Computer system 1200 may take various different forms. For example, computer system 1200 may be embodied as a tablet, a desktop, a laptop, a mobile device, a cloud device, an HMD, or a standalone device, such as those described throughout this disclosure. Computer system 1200 may also be a distributed system that includes one or more connected computing components/devices that are in communication with computer system 1200. FIG. 12 specifically calls out how computer system 1200 may be embodied as a tablet 1200A, a laptop 1200B, or an HMD 1200C, but the ellipsis 1200D illustrates how computer system 1200 may be embodied in other forms as well.

The computer system 1200 includes various different components. FIG. 12 shows that computer system 1200 includes one or more processors 1205 (aka a "hardware processing unit"), a machine learning (ML) engine 1210, graphics rendering engine(s) 1225, a display system 1230, input/output (I/O) interfaces 1235, one or more sensors 1240, and storage 1245.

Regarding the processor(s) 1205, it will be appreciated that the functionality described herein can be performed, at least in part, by one or more hardware logic components (e.g., the processor(s) 1205). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1200. The different components, modules, engines, and services described herein may be implemented as objects or processors that execute on computer system 1200 (e.g. as separate threads).

The ML engine 1210 may be implemented as a specific processing unit (e.g., a dedicated processing unit as described earlier) configured to perform one or more specialized operations for the computer system 1200. The ML engine 1210 (or perhaps even just the processor(s) 1205) can be configured to perform any of the disclosed method acts or other functionalities.

In some instances, the graphics rendering engine 1225 is configured, with the hardware processing unit 1205, to render one or more virtual objects within the scene. As a result, the virtual objects accurately move in response to a movement of the user and/or in response to user input as the user interacts within the virtual scene. The computer system 1200 may include a display system 1230 (e.g., laser diodes, light emitting diodes (LEDs), microelectromechanical systems (MEMS), mirrors, lens systems, diffractive optical elements (DOES), display screens, and/or combinations thereof) for presenting virtual objects within the scene.

I/O interface(s) 1235 includes any type of input or output device. Such devices include, but are not limited to, touch screens, displays, a mouse, a keyboard, a controller, and so forth. Any type of input or output device should be included among I/O interface(s) 1235, without limitation.

During use, a user of the computer system 1200 is able to perceive information (e.g., a mixed-reality environment) through a display screen that is included among the I/O interface(s) 1235 and that is visible to the user. The I/O interface(s) 1235 and sensors 1240/1265 may also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 1200 may also be connected (via a wired or wireless connection) to external sensors 1265 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 1245 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well.

Storage 1245 is shown as including executable instructions (i.e. code 1250). The executable instructions (i.e. code 1250) represent instructions that are executable by the processor(s) 1205 of computer system 1200 to perform the disclosed operations, such as those described in the various methods. Storage 1245 is also shown as including data 1255. Data 1255 may include any type of data, including image data, depth data, pose data, tracking data, and so forth, without limitation.

The disclosed embodiments may comprise or utilize a special-purpose or general-purpose computer including computer hardware, such as, for example, one or more processors (such as processor(s) 1205) and system memory (such as storage 1245), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras) or devices via a network 1260. For example, computer system 1200 can communicate with any number devices or cloud services to obtain or process data. In some cases, network 1260 may itself be a cloud network. Furthermore, computer system 1200 may also be connected through one or more wired or wireless networks 1260 to remote/separate computer systems(s) 1270 that are configured to perform any of the processing described with regard to computer system 1200.

A "network," like network 1260, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1260. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for generating temporally consistent depth maps, comprising:
    one or more processors; and
    one or more hardware storage devices having stored computer-executable instructions that are operable, when executed by the one or more processors, to cause the system to:
        obtain a first stereo pair of images of a scene captured at a first timepoint and with a first pose associated with the system;
        generate a first depth map of the scene based on the first stereo pair of images;
        obtain a second stereo pair of images of the scene, the second stereo pair of images being captured at a second timepoint and with a second pose associated with the system;
        generate a reprojected first depth map by performing a reprojection operation using the first pose, the second pose, and the first depth map, wherein the reprojected first depth map is aligned with the second stereo pair of images; and
        generate a second depth map that corresponds to the second stereo pair of images by performing stereo matching on the second stereo pair of images using the reprojected first depth map, thereby improving temporal consistency of the first depth map with the second depth map, and overall depth map quality.

2. The system of claim 1, further comprising:
    a stereo pair of cameras, wherein the stereo pair of cameras captures the first stereo pair of images and the second stereo pair of images.

3. The system of claim 1, further comprising:
    a head tracking system, comprising:
        at least one head tracking camera;
        an accelerometer;
        a gyroscope; and
        a magnetometer, wherein the first pose associated with the system and the second pose associated with the system are based on measurements obtained by the head tracking system.

4. The system of claim 1, wherein the first pose associated with the system is different than the second pose associated with the system.

5. The system of claim 1, wherein generating the second depth map using the reprojected first depth map includes implementing a temporal consistency term into a cost function for performing stereo matching on the second stereo pair of images.

6. The system of claim 5, wherein the temporal consistency term applies a cost bonus for pixels of the second depth map that share a same or similar disparity value with corresponding pixels of the reprojected first depth map.

7. The system of claim 1, wherein the first stereo pair of images is a downsampled first stereo pair of images and the first depth map of the scene is based on the downsampled first stereo pair of images, and
wherein the second stereo pair of images is a downsampled second stereo pair of images and the second depth map is generated by performing stereo matching on the downsampled second stereo pair of images.

8. The system of claim 1, wherein the first depth map of the scene is one of a plurality of first depth maps of the scene, each of the plurality of first depth maps having a different image size.

9. The system of claim 8, wherein the second stereo pair of images is one of a plurality of second stereo pairs of images, the second stereo pair of images having a lowest image size of the plurality of second stereo pairs of images.

10. The system of claim 9, wherein the computer-executable instructions are further operable to cause the system to:
generate an upsampled second depth map by applying an edge-preserving filter to the second depth map, wherein the edge-preserving filter utilizes the second depth map, at least one of the plurality of first depth maps, and at least one of the plurality of second stereo pairs of images to generate the upsampled second depth map.

11. The system of claim 10, wherein the edge-preserving filter is a joint bilateral filter.

12. The system of claim 1, wherein the computer-executable instructions are further operable, when executed by the one or more processors, to cause the system to:
reproject depth points based on the second depth map to correspond to a user perspective.

13. A method for generating temporally consistent depth maps, comprising:
obtaining a first stereo pair of images of a scene captured at a first timepoint and with a first pose associated with a computer system;
generating a first depth map of the scene based on the first stereo pair of images;
obtaining a second stereo pair of images of the scene, the second stereo pair of images being captured at a second timepoint and with a second pose associated with the computer system;
generating a reprojected first depth map by performing a reprojection operation using the first pose, the second pose, and the first depth map, wherein the reprojected first depth map is aligned with the second stereo pair of images; and
generating a second depth map that corresponds to the second stereo pair of images by performing stereo matching on the second stereo pair of images using the reprojected first depth map, thereby improving temporal consistency of the first depth map with the second depth map, and overall depth map quality.

14. The method of claim 13, wherein the first pose associated with the computer system is different than the second pose associated with the computer system.

15. The method of claim 13, wherein generating the second depth map using the reprojected first depth map includes implementing a temporal consistency term into a cost function for performing stereo matching on the second stereo pair of images.

16. The method of claim 15, wherein the temporal consistency term applies a cost bonus for pixels of the second depth map that share a same or similar disparity value with corresponding pixels of the reprojected first depth map.

17. The method of claim 13, wherein the first depth map of the scene is one of a plurality of first depth maps of the scene, each of the plurality of first depth maps having a different image size.

18. The method of claim 17, wherein the second stereo pair of images is one of a plurality of second stereo pairs of images, the second stereo pair of images having a lowest image size of the plurality of second stereo pairs of images.

19. The method of claim 18, further comprising:
generating an upsampled second depth map by applying an edge-preserving filter to the second depth map, wherein the edge-preserving filter utilizes the second depth map, at least one of the plurality of first depth maps, and at least one of the plurality of second stereo pairs of images to generate the upsampled second depth map.

20. One or more hardware storage devices having stored thereon computer-executable instructions, the computer-executable instructions being executable by one or more processors of a computer system to cause the computer system to:
obtain a first stereo pair of images of a scene captured at a first timepoint and with a first pose associated with the computer system;
generate a first depth map of the scene based on the first stereo pair of images;
obtain a second stereo pair of images of the scene, the second stereo pair of images being captured at a second timepoint and with a second pose associated with the computer system;
generate a reprojected first depth map by performing a reprojection operation using the first pose, the second pose, and the first depth map, wherein the reprojected first depth map is aligned with the second stereo pair of images; and
generate a second depth map that corresponds to the second stereo pair of images by performing stereo matching on the second stereo pair of images using the reprojected first depth map, thereby improving temporal consistency of the first depth map with the second depth map, and overall depth map quality.

\* \* \* \* \*